United States Patent
Song

(10) Patent No.: US 12,406,338 B2
(45) Date of Patent: Sep. 2, 2025

(54) PSEUDOINVERSE GUIDANCE FOR DATA RESTORATION WITH DIFFUSION MODELS

(71) Applicant: NVIDIA Corporation, Santa Clara, CA (US)

(72) Inventor: Jiaming Song, San Carlos, CA (US)

(73) Assignee: NVIDIA Corporation, Santa Clara, CA (US)

( * ) Notice: Subject to any disclaimer, the term of this patent is extended or adjusted under 35 U.S.C. 154(b) by 401 days.

(21) Appl. No.: 18/169,545

(22) Filed: Feb. 15, 2023

(65) Prior Publication Data
US 2024/0046422 A1    Feb. 8, 2024

Related U.S. Application Data

(60) Provisional application No. 63/394,776, filed on Aug. 3, 2022.

(51) Int. Cl.
| | |
|---|---|
| *G06T 5/70* | (2024.01) |
| *G06T 5/50* | (2006.01) |
| *G06T 5/77* | (2024.01) |

(52) U.S. Cl.
CPC .............. *G06T 5/70* (2024.01); *G06T 5/50* (2013.01); *G06T 5/77* (2024.01);
(Continued)

(58) Field of Classification Search
CPC .... G06T 5/70; G06T 5/50; G06T 5/77; G06T 2207/20081; G06T 2207/20084;
(Continued)

(56) References Cited

U.S. PATENT DOCUMENTS

| | | | | |
|---|---|---|---|---|
| 11,847,761 | B2 * | 12/2023 | Zhou | ........................ G06N 3/08 |
| 2020/0003858 | A1 * | 1/2020 | Takeshima | ......... G01R 33/5608 |

(Continued)

FOREIGN PATENT DOCUMENTS

| | | | | |
|---|---|---|---|---|
| CN | 105164725 A | * | 12/2015 | ........... G06T 11/003 |
| CN | 113811921 A | * | 12/2021 | ............. A61B 5/055 |
| JP | 2019211475 A | * | 12/2019 | ............. A61B 6/032 |

OTHER PUBLICATIONS

Sohl-Dickstein, J., et al., "Deep unsupervised learning using nonequilibrium thermodynamics," arXiv preprint arXiv:1503.03585, Mar. 2015.

(Continued)

*Primary Examiner* — Jose L Couso
(74) *Attorney, Agent, or Firm* — Leydig, Voit & Mayer, Ltd.

(57) ABSTRACT

A diffusion model is augmented with pseudoinverse guidance to restore data, removing artifacts and generating high-quality reconstructed data from limited, low-quality and/or noisy input data. The low-quality input data is denoised by a diffusion model and the denoised input data is combined with a guidance term to produce output data of higher-quality compared with the low-quality input data. The guidance term is a vector-Jacobian product that encourages consistency between the denoised input data and measurements after a pseudoinverse transformation. The denoising process may be applied in an iterative fashion to generate valid solutions to the inverse problem. The augmented diffusion model is a problem-agnostic (e.g., plug-and-play) denoiser that can restore data for a variety of tasks. Example image restoration tasks include denoising, JPEG denoising, deblurring, outpainting, inpainting, colorization, high-dynamic range, and super-resolution.

22 Claims, 11 Drawing Sheets

(52) U.S. Cl.
CPC ............... *G06T 2207/20081* (2013.01); *G06T 2207/20084* (2013.01); *G06T 2207/20212* (2013.01)

(58) Field of Classification Search
CPC . G06T 2207/20212; G06T 5/60; G06T 3/147;
G06T 3/4053; G06T 5/10; G06T 5/73;
G06T 2207/10088; G06T 7/0012; G06T
11/006; G06T 11/008; G06T 2207/10116;
G06T 2207/30004; G06T 2207/10072;
G06T 2207/10004; G06T 2207/10061;
G06T 2207/10132; G06T 2207/20221;
G06T 2207/30016; G06T 2210/41; G06T
3/4046; G06T 9/002; G06T 2207/20076;
G06V 20/70; G06V 2201/03; G06V
10/70; G06V 10/764; G06V 10/776;
G06V 10/751; G06V 10/454; G06V
10/54; G06V 10/774; G06V 10/82; G06V
20/41; G06V 30/18057; G06V 20/698;
G06V 30/19173; G06F 18/20; G06F
18/217; G06F 18/2178; G06F 18/10;
G06F 18/213; G06F 18/23; G06F
18/2415; G06F 18/25; G06F 2218/08;
G06F 18/214; G06F 18/22; G06F 18/241;
G06F 18/24; G06F 18/2411; G06F 30/27;
H04N 23/30; H04N 23/54; H04N 23/683;
H04N 25/60; H04N 25/617; G06N 3/02;
G06N 3/08–088; G06N 3/0445; G06N
3/0454; G06N 3/0464; G06N 3/4046;
G06N 3/4053; G06N 7/00; G06N 7/01;
G06N 20/00; G06K 7/1482; Y10S
128/925

See application file for complete search history.

(56) References Cited

U.S. PATENT DOCUMENTS

| | | | | |
|---|---|---|---|---|
| 2020/0104745 A1* | 4/2020 | Li | ............................ | G01V 1/364 |
| 2020/0107378 A1* | 4/2020 | Velev | ..................... | H04W 48/08 |
| 2020/0311490 A1* | 10/2020 | Lee | ............................ | G06T 5/60 |
| 2023/0058096 A1* | 2/2023 | Ferrés | ........................ | G06T 7/40 |
| 2023/0103638 A1* | 4/2023 | Saharia | ................. | G06V 10/454 |
| | | | | 382/155 |
| 2023/0236271 A1* | 7/2023 | Fessler | ...................... | G06T 5/70 |
| | | | | 324/309 |

OTHER PUBLICATIONS

Vahdat, A., et al., "Score-based generative modeling in latent space," arXiv preprint arXiv:2106.05931, Jun. 2021.
Vincent, P., "A connection between score matching and denoising autoencoders," Neural computation, 23(7):1661-1674, Jul. 2011.
Whang, J., et al., "Deblurring via stochastic refinement," arXiv preprint arXiv:2112.02475, Dec. 2021.
Yu, F., et al., "LSUN: Construction of a large-scale image dataset using deep learning with humans in the loop," arXiv preprint arXiv:1506.03365, Jun. 2015.
Zhang, Q., et al., "Fast sampling of diffusion models with exponential integrator," arXiv preprint arXiv:2204.13902, Apr. 2022.
Zhang, Q., et al., "gDDIM: Generalized denoising diffusion implicit models," arXiv prepring arXiv:2206.05564, Jun. 2022.
Bora, A., et al., "Compressed sensing using generative models," arXiv preprint arXiv:1703.03208, Mar. 2017.
Choi, J., et al., "ILVR: Conditioning method for denoising diffusion probabilistic models," arXiv preprint arXiv:2108.02938, Aug. 2021.
Chung, H., et al., "Come-Closer-Diffuse-Faster: Accelerating conditional diffusion models for inverse problems through stochastic contraction," arXiv preprint arXiv:2112.05146, Dec. 2021.
Daras, G., et al., "Intermediate layer optimization for inverse problems using deep generative models," arXiv preprint arXiv:2012.07364, Feb. 2021.
Dhariwal, P., et al., "Diffusion models beat GANs on image synthesis," arXiv preprint arXiv:2105.05233, May 2021.
Ehrlich, M., et al., "Quantization guided JPEG artifact correction," arXiv preprint arXiv:2004.09320, Apr. 2020.
He, K., et al., "Deep residual learning for image recognition," arXiv preprint arXiv:1512.03385, Dec. 2015.
Heusel, M., et al., "GANs trained by a two time-scale update rule converge to a local nash equilibrium," arXiv preprint arXiv:1706.08500, Jun. 2017.
Ho, J., et al., "Denoising diffusion probabilistic models," arXiv preprint arXiv:2006.11239, Jun. 2020.
Jalal, A.,, et al., "Robust compressed sensing MRI with deep generative priors," arXiv preprint arXiv:2108.01368, Aug. 2021.
Menon, S., et al., "PULSE: Self-Supervised photo unsampling via latent space exploration of generative models," arXiv preprint arXiv:2003.03808, Mar. 2020.
Pan, X., et al., "Exploiting deep generative prior for versatile image restoration and manipulation," IEEE transactions on pattern analysis and machine intelligence, PP, Sep. 2021.
Romano, Y., et al., "The little engine that could: Regularization by denoising (RED)," arXiv preprint arXiv:1611.02862, Nov. 2016.
Russakovsky, O., et al., "ImageNet large scale visual recognition challenge," International Journal of Computer Vision, 115(3):211-252, Dec. 2015.
Santurkar, S., et al., "Image synthesis with a single (robust) classifier," arXiv preprint arXiv:1906.09453, Jun. 2019.
Anderson, B.D., "Reverse-time diffusion equation models," Stochastic processes and their applications, 12(3):313-326, May 1980.
Bardsley, J., "MCMC-based image reconstruction with uncertainty quantification," Siam Journal on Scientific Computing, 34(3):A 1316-A 1332, Jun. 2012.
Binkowski, M., et al., "Demystifying MMD GANs," arXiv preprint arXiv:1801.01401, Jan. 2021.
Chung, H., et al., "Score-based diffusion models for accelerated MRI," Medical Image Analysis, pp. 102479, Jul. 2022.
Chung, H., et al., "Diffusion posterior sampling for general noisy inverse problems," arXiv preprint arXiv:2209.14687, Nov. 2022.
Chung, H., et al., "Improving diffusion models for inverse problems using manifold constraints," arXiv preprint arXiv:2206.00941, Oct. 2022.
Daras, G., et al., "Score-guided intermediate layer optimization: Fast langevin mixing for inverse problems," arXiv preprint arXiv:2206.09104, Jun. 2022.
Daras, G., et al., "Soft diffusion: Score matching for general corruptions," arXiv preprint arXiv:2209.05442, Oct. 2022.
Efron, B., "Tweedie's formula and selection bias," Journal of American Statistical Association, 106(496):1602-1614, Apr. 2012.
Goodfellow, I., et al., "Generative adversarial networks," In Advances in neural information processing systems, pp. 2672-2680, Jun. 2014.
Grenander, U., et al., "Representations of knowledge in complex systems," Journal of the Royal Statistical Society: Series B (Methodological), 56(4):549-581, Nov. 1994.
Ho, J., et al., "Classifier-free diffusion guidance," arXiv Preprint arXiv:2207.12598, Jul. 2022.
Ho, J., et al., "Video diffusion models," arXiv preprint arXiv:2204.03458, Jun. 2022.
Hoogeboom, E., et al., "Blurring diffusion models," arXiv preprint arXiv:2209.05557, Sep. 2022.
Jing, B., et al., "Subspace diffusion generative models," arXiv preprint arXiv:2205.01490, May 2022.
Kadkhodaie, Z., et al., "Stochastic solutions for linear inverse problems using prior implicit in a denoiser," Advances in Neural Information Processing Systems, 34:13242-13254, Jul. 2021.
Karras, T., et al., "Elucidating the design space of diffusion-based generative models," arXiv preprint arXiv:2206.00364, Oct. 2022.
Kawar, B., et al., "Denoising diffusion restoration models," arXiv preprint arXiv:2201.11793, Oct. 2022.
Kawar, B., et al., "JPEG artifact correction using denoising diffusion restoration models," arXiv preprint arXiv:2209.11888, Nov. 2022.

(56) References Cited

OTHER PUBLICATIONS

Kong, Z., et al., "DiffWave: A versatile diffusion model for audio synthesis," arXiv preprint arXiv:2009.09761, Mar. 2021.

Laumont, R., et al., "Bayesian imaging using plug and play priors: when langevin meets tweedie," SIAM Journal on Imaging Sciences, 15(2):701-737, Jan. 2022.

Li, X.L., et al., "Diffusion-LM improves controllable text generation," arXiv preprint arXiv:2205.14217, May 2022.

Liu, Y., et al., "Single-image HDR reconstruction by learning to reverse the camera pipeline," In Proceedings of the IEEE/CVF Conference on Computer Vision and Pattern Recognition, pp. 1651-1660, Apr. 2020.

Lu, C., et al., "DPM-solver: A fast ODE solver for diffusion probablistic model sampling in around 10 steps," arXiv preprint arXiv:2206.00927, Oct. 2022.

Meng, C., et al., "SDEdit: Image synthesis and editing with stochastic differential equations," arXiv preprint arXiv:2108.01073, Jan. 2022.

Ongie, G., et al., "Deep learning techniques for inverse problems in imaging," IEEE Journal on Selected Areas in Information Theory, 1(1):39-56, May 2020.

Rissanen, S., et al., "Generative modelling with inverse heat dissiptation," arXiv preprint arXiv:2206.13397, Dec. 2022.

Rombach, R., et al., "High-resolution image synthesis with latent diffusion models," In Proceedings of the IEEE/CVF Conference on Computer Vision and Pattern Recognition, pp. 10684-10695, Apr. 2022.

Ryu, D., et al., "Pyramidal denoising diffusion probabilistic models," arXiv preprint arXiv:2208.01864, Sep. 2022.

Saharia, C., et al., "Image super-resolution via iterative refinement," arXiv preprint arXiv:2104.07636, Jun. 2021.

Saharia, C., et al., "Palette: Image-to-image diffusion models," in ACM SIGGRAPH 2022 Conference Proceedings, pp. 1-10, May 2022.

Saharia, C., et al., "Photorealistic text-to-image diffusion models with deep language understanding," arXiv preprint arXiv:2205.11487, May 2022.

Saremi, S., et al., "Neural empirical bayes," Journal of Machine Learning Research: JMLR, 20(181):1-23, Apr. 2020.

Sijbers, J., et al., "Maximum likelihood estimation of signal amplitude and noise variance from mr data," Magnetic Resonance in Medicine: An Official Journal of the International Society for Magnetic Resonance in Medicine, 51(3):586-594, Feb. 2004.

Sinha, A., et al., "D2C: Diffusion-decoding models for few-shot conditional generation," Advances in Neural Information Processing Systems, 34:12533-12548, Jun. 2021.

Song, J., et al., "Denoising diffusion implicit models," In International Conference on Learning Representations, Oct. 2022.

Song, Y., et al., "Solving inverse problems in medical imaging with score-based generative models," arXiv preprint arXiv:2111.08005, Jun. 2022.

Song, Y., et al., "Score-based generative modeling through stochastic differential equations," In International Conference on Learning Representations, Feb. 2021.

Stein, C., "Estimation of the mean of a multivariate normal distribution," The Annals of Statistics, vol. 9, No. 6, pp. 1135-1151, Nov. 1981.

Tashiro, Y., et al., "CSDI: Conditional score-based diffusion models for probabilistic time series imputation," Advances in Neural Information Processing Systems, 34:24804-24816, Oct. 2021.

Ulyanov, D., et al., "Deep image prior," In Proceedings of the IEEE conference on computer vision and pattern recognition, pp. 9446-9454, May 2020.

Venkatakrishnan, S., et al., "Plug-and-play priors for model based reconstruction," In 2013 IEEE Global Conference on Signal and Information Processing, pp. 945-948, IEEE, Dec. 2013.

Yu, J., et al., "Free-form image inpainting with gated convolution," In Proceedings of the IEEE/CVF international conference on computer vision, pp. 4471-4480, Oct. 2019.

* cited by examiner

Denoised Input Data 250

Degraded Denoised Input Data 255

Degraded Data 275

Output Data 280

PSEUDOINVERSE GUIDANCE FOR DATA RESTORATION WITH DIFFUSION MODELS

CLAIM OF PRIORITY

This application claims the benefit of U.S. Provisional Application No. 63/394,776 titled "Pseudoinverse Guidance for Data Restoration," filed Aug. 3, 2022, the entire contents of which is incorporated herein by reference.

BACKGROUND

Diffusion models have become competitive candidates for solving various inverse problems. Models trained for specific inverse problems work well but are limited to the particular use cases, whereas methods that use problem-agnostic models are general but often perform worse empirically. There is a need for addressing these issues and/or other issues associated with the prior art.

SUMMARY

Embodiments of the present disclosure relate to pseudoinverse guidance for data restoration with diffusion models. Systems and methods are described that use pseudoinverse guidance for data restoration. Generative models are leveraged to restore high-quality data from limited, low-quality and/or noisy observations. More specifically, the generative model learns solve an inverse problem, reversing a process that degraded the high-quality data. Based on low-quality data that is available, the generative model learns to reconstruct high-quality data that, when degraded, produces the low-quality data, with an assumption of the degradation process. Typically, multiple variations of the high-quality data may be reconstructed that, when degraded, correspond to the low-quality data.

In an embodiment, a neural network model is augmented with pseudoinverse guidance to restore data, removing visual artifacts and generating a reconstructed image. In an embodiment, the neural network model comprises a diffusion model. Conventional data restoration methods rely on a diffusion model that is trained for a specific reconstruction task. In contrast, the augmented diffusion model is a problem-agnostic (e.g., plug-and-play) denoiser that can restore data for a variety of tasks. In the image processing domain, the tasks may include, but are not limited to, image super-resolution (recover high-resolution images from low-resolution images), image deblurring (recover blurring artifacts from images, such as optical blur and motion blur), JPEG artifact restoration (recover high-quality images from JPEG-compressed images), inpainting (recovering missing parts of an image), outpainting (semantic extension of the input image beyond its available content), denoising, colorization, computational tomography (recover images from computed tomography scans), magnetic resonance imaging (MRI) reconstruction, and astronomical interferometry. Inverse problem solvers are also applicable other domains such as video (video prediction, super-resolution, denoising, frame interpolation, inpainting), and representations of 3D data (three-dimensional reconstruction). Pseudoinverse guidance enables restoration of non-linear and/or non-differentiable tasks (such as JPEG encoding) as well as differentiable tasks—without requiring problem-specific training.

In an embodiment, the method includes receiving denoised data generated by a neural network model and applying a function to the denoised data to compute degraded data, where the function performs a pseudoinverse transformation. Noisy input data is received and a result is computed based on differences between the noisy input data and the degraded data. The result and the denoised data are combined to produce reconstructed data with a reduced number of artifacts compared with the noisy input data. In an embodiment, the result comprises a vector-Jacobian product.

BRIEF DESCRIPTION OF THE DRAWINGS

The present systems and methods for pseudoinverse guidance for data restoration with diffusion models are described in detail below with reference to the attached drawing figures, wherein.

DETAILED DESCRIPTION

Systems and methods are disclosed related to applying pseudoinverse guidance during data restoration performed by diffusion models. A data reconstruction system using the pseudoinverse guidance comprises a general-purpose inverse problem solver based on a diffusion model. The data reconstruction system generates high-quality data restoration results from possibly noisy input data (observations or measurements). In an embodiment, a pre-trained denoising diffusion model produces initial guesses for generating the restored data. The pseudoinverse guidance uses noisy input data to improve initial predictions, revising the predicted restored data to become more similar to reference data (true restored or high-quality data). More concretely, in an embodiment, a probability distribution of the noisy input data is modeled via a Gaussian distribution, and the initial prediction is modified by the pseudoinverse guidance such that the probability of the output data matching the reference data is increased. The initial and subsequent predictions may be iteratively processed by the data reconstruction system to further improve the predicted restored data. Parameters used by the data reconstruction system are trained via gradient descent. Parameter gradients are computed via backpropagation that depends on a "pseudoinverse" of a degradation function. The gradients may be computed without requiring that the degradation function is differentiable, linear, or limited to singular values. For example, in JPEG restoration, the degradation function is JPEG encoding, and a generalized pseudoinverse is JPEG decoding.

Figure 1A:
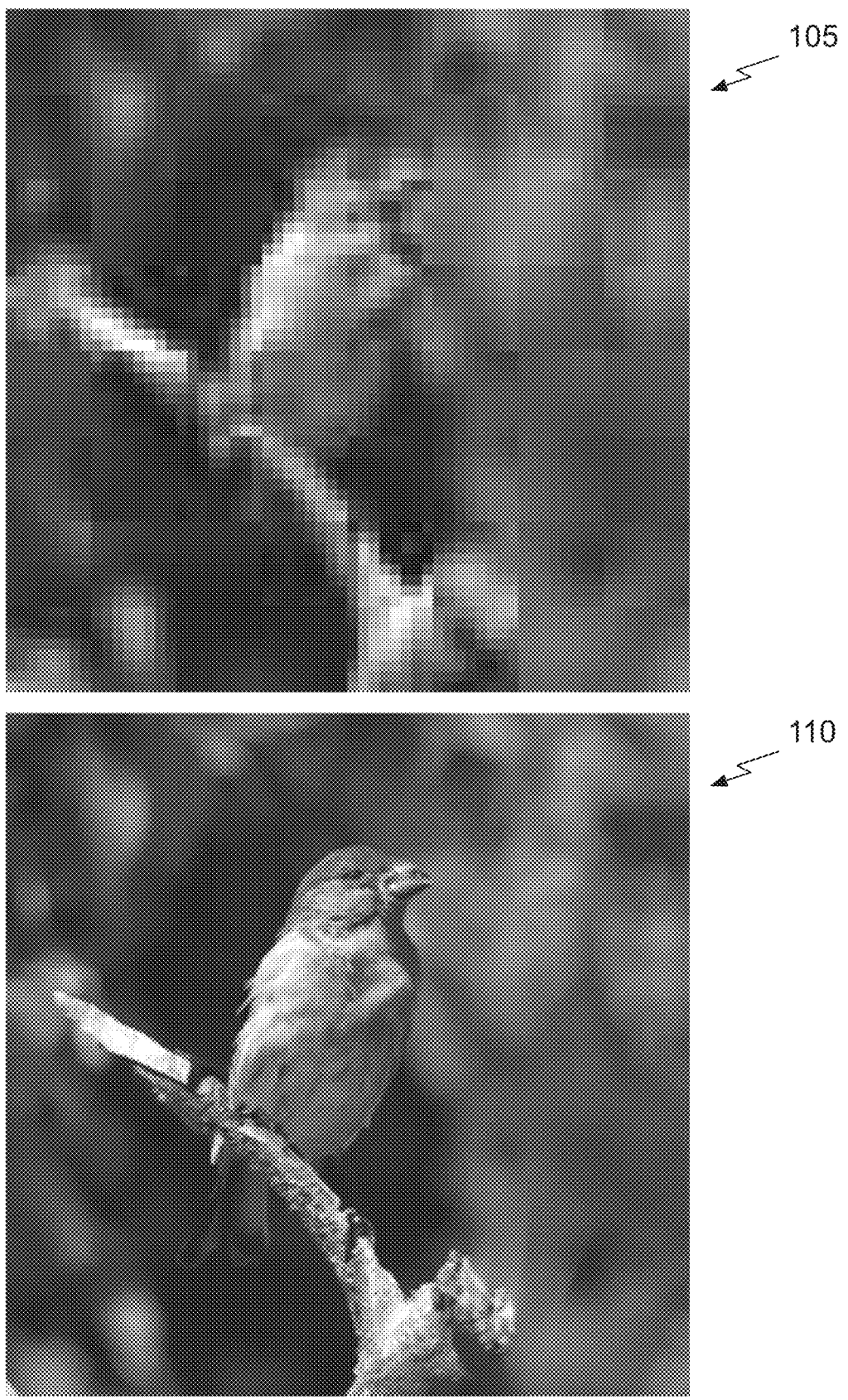
FIG. 1A illustrates a degraded image and a reconstructed image, in accordance with an embodiment.

FIG. 1A illustrates a degraded image 105 and a reconstructed image 110, in accordance with an embodiment. The degraded image 105 is JPEG (Joint Photographic Experts Group) encoded and processed as an input image by a pseudoinverse guided data reconstruction system using the to produce the reconstructed image 110. For any function, a pseudoinverse of that function is derived that approximately inverts the original function. For example, a JPEG encoded image, such as degraded image 105, can be JPEG decoded and then the decoded image can be JPEG encoded to produce the same JPEG encoded image. In other words, JPEG decode is "pseudoinverse" of JPEG encode. While the JPEG encoded image is not the same as the original image because the encoding is lossy, decoding and encoding the decoded image is lossless.

The degrading via encoding and restoring via decoding generalizes the well-known notion of Moore-Penrose matrix pseudoinverse that satisfies $Hh^T = H$, where H is JPEG encode (compression) and $h^T$ is the pseudoinverse transformation, JPEG decode (decompression). Conventional denoising techniques are not effective for reconstructing JPEG encoded data because JPEG encoding is a non-differentiable function and training a diffusion model relies on backpropagating derivatives of differentiable functions.

Conventional reconstruction or denoising techniques that rely on diffusion models are categorized into "replacement"-based methods and "guidance"-based methods. In contrast, a reconstruction system using the pseudoinverse guidance is based on "guidance" and does not rely on "replacement". In contrast with existing "guidance"-based methods, the generalized pseudoinverse model does not require assumptions about the degradation function, such as differentiability, linearity, and/or limited singular values. Therefore, the reconstruction system using the pseudoinverse guidance is able to perform a much wider range of data restoration tasks, such as JPEG restoration, noisy image inpainting, and other data restoration problems that combine one or more degradation functions any one of which may be non-differentiable.

Figure 1B:
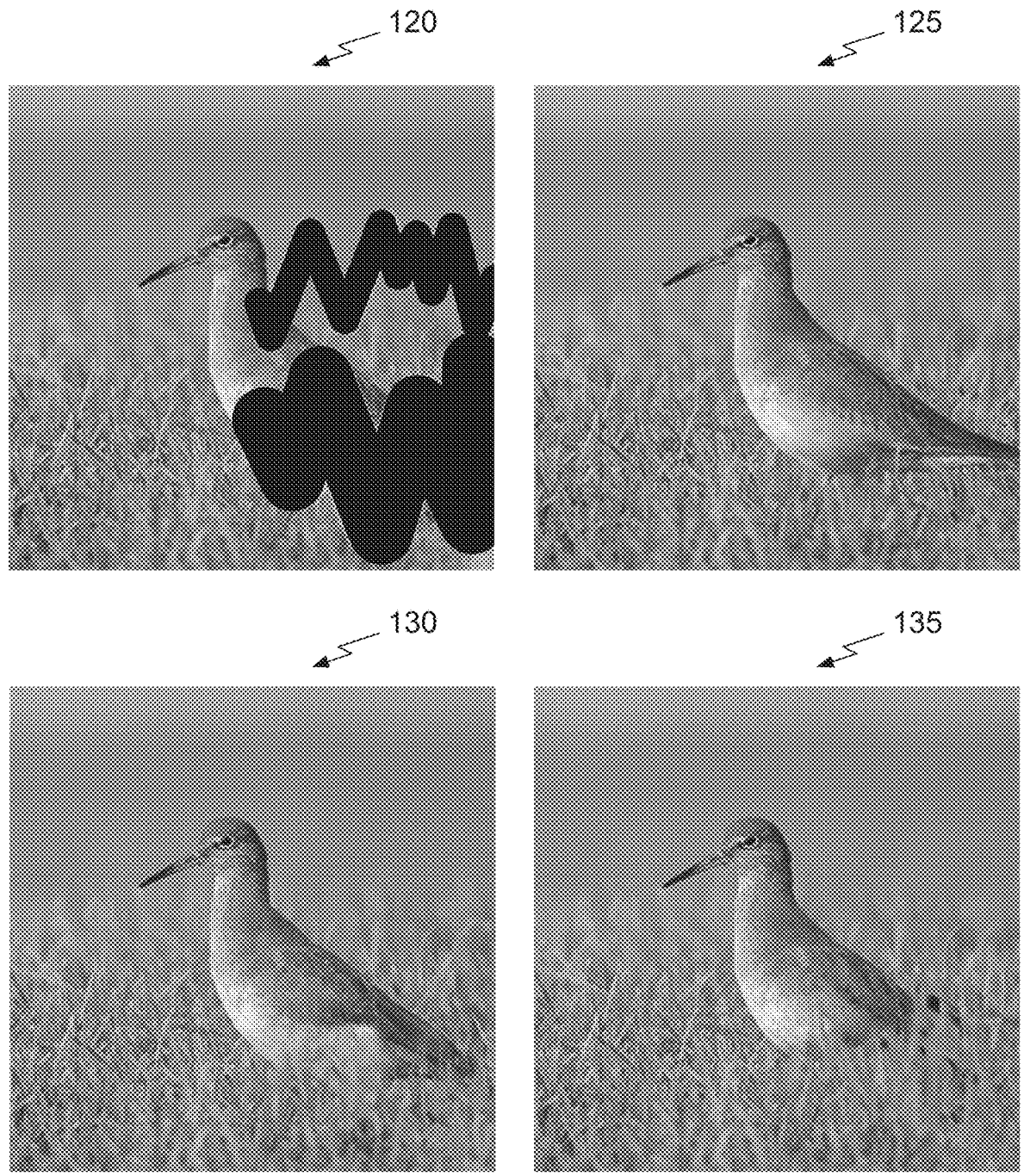
FIG. 1B illustrates a degraded image and reconstructed images, in accordance with an embodiment.

FIG. 1B illustrates a degraded image 120 and reconstructed images 125, 130, and 135, in accordance with an embodiment. The degraded image 120 is partially masked and any one of the reconstructed images 125, 130, and 135 is a valid reconstruction for a noisy image inpainting reconstruction task. The pseudoinverse guided data reconstruction system may generate any one of the reconstructed images 125, 130, and 135 when the degraded image 120 is processed. During training of a conventional diffusion model, one or more of the reconstructed (clean) images 125, 130, and 135 may be used as reference images that are each paired with the degraded image 120.

More illustrative information will now be set forth regarding various optional architectures and features with which the foregoing framework may be implemented, per the desires of the user. It should be strongly noted that the following information is set forth for illustrative purposes and should not be construed as limiting in any manner. Any of the following features may be optionally incorporated with or without the exclusion of other features described.

A neural network model is augmented with pseudoinverse guidance to restore data, removing visual artifacts and generating high-quality reconstructed data (e.g., reconstructed images 125, 130, and 135) from limited, low-quality and/or noisy input data (e.g., degraded image 120). In an embodiment, the neural network model comprises a diffusion model. The low-quality input data is denoised by a neural network model and the denoised input data is combined with a pseudoinverse guidance term to produce output data of higher-quality compared with the low-quality input data. The guidance term is a vector-Jacobian product that encourages consistency between the denoised input data and degraded reference data after a pseudoinverse transformation. The reconstruction process may be applied in an iterative fashion to generate valid solutions to the inverse problem. The augmented diffusion model is a problem-agnostic (e.g., plug-and-play) denoiser that can restore data for a variety of tasks without training separate diffusion models for each task.

Figure 2A:
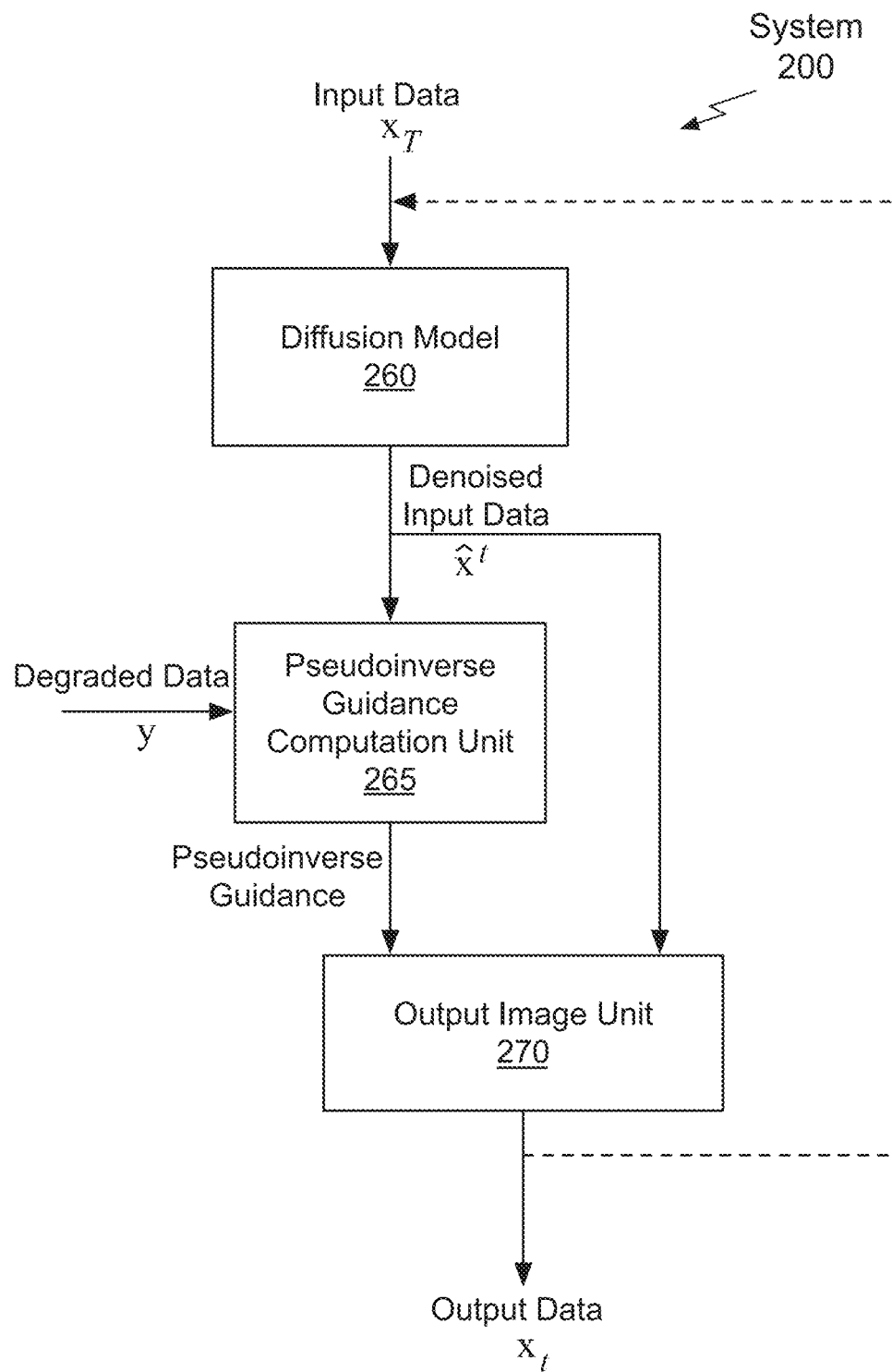
FIG. 2A illustrates a block diagram of an example data restoration system suitable for use in implementing some embodiments of the present disclosure.

FIG. 2A illustrates a block diagram of an example data restoration system 200 suitable for use in implementing some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory. Furthermore, persons of ordinary skill in the art will understand that any system that performs the operations of the data restoration system 200 is within the scope and spirit of embodiments of the present disclosure.

The data restoration system 200 comprises a diffusion model 260, a pseudoinverse guidance computation unit 265, and an output image unit 270. In an embodiment, the input data $x_T$ is initial noise (such as Gaussian noise). The diffusion model 260 processes the input data to predict denoised input data $\hat{x}_t$. In an embodiment, the diffusion model 260 is pre-trained. The pseudoinverse guidance computation unit 265 receives the denoised input data and degraded data (measurement y) that is a degraded version of reference data $x_0$. The reference data is the desired output data, such as the reconstructed images 125, 130, and 135. The degraded image 120 is an example of degraded data. A function is applied to produce the noisy or degraded data y. In an embodiment, the degraded data is obtained as a function h of $x_0$, i.e., $y = h(x_0)$. The function h is a data corruption process and can take different forms depending on the application, such as reduced resolution when the task is to perform super-resolution, and masking when the task is to perform inpainting.

The pseudoinverse guidance computation unit 265 processes the degraded data and the denoised input data to compute the pseudoinverse guidance. The pseudoinverse guidance computation unit 265 applies a pseudoinverse transformation of the degradation function ($h^T$) to the degraded data, $h^T$ (y). For example, when the degradation function is JPEG encoding, the degraded data y is the JPEG encoded reference data and the pseudoinverse transformation is JPEG decoding. The degraded data can be repeatedly JPEG decoded and JPEG encoded and each JPEG encoded version of the reference data will be identical. Similarly, each JPEG decoded version of the reference data will be identical. The pseudoinverse guidance computation unit 265 applies the degradation function to the denoised input data to produce a degraded denoised input data and then applies the pseudoinverse transformation of the degradation function to the degraded denoised input data, producing $h^T$ (h ($\hat{x}_t$)). For the JPEG example, where h is a JPEG encode function and the pseudoinverse transformation $h^T$ is a JPEG decode function. The pseudoinverse guidance computation unit 265 then computes a vector as the difference $h^T$ (y)–$h^T$ (h($\hat{x}_t$)).

The vector is then multiplied by a Jacobian term, which is a partial derivative of the denoised input data with respect to previous reconstructed output data $$\left(\frac{\partial \hat{x}_t}{\partial x_t}\right),$$

to compute a vector Jacobian product (VJP) as the pseudoinverse guidance. The VJP guides the data restoration system 200 to produce reconstructed data that that approximates the noisy input data without artifacts. In other words, the reconstructed data has a reduced number of artifacts compared with the noisy input data. The pseudoinverse guidance and denoised input data $\hat{x}^t$ generated by the diffusion model 260 are combined by the output image unit 270 to predict reconstructed output data (one or more of the images $x_t$).

The data restoration system 200 may be used to restore data for many different tasks. For example, to perform a super-resolution task, then h is the downsampling (reduce resolution) operator, and $h^T$ is the upsampling operator. To perform an inpainting task, then h is a masking operator and $h^T$ is the identity operator. There are also other applications, such as magnetic resonance imaging (MRI) data recovery where one wants to recover the MRI image from a set of sparse measurements—h can be roughly viewed as Fourier transform followed by inpainting. Of course, in many cases multiple h operators may be combined, such as perform super-resolution and JPEG tasks at the same time. While a conventional denoising method can train a different model on each specific task, it is not cost-efficient as the number of tasks grows. The data restoration system 200 is not limited to task-specific training, and instead is trained as a single task-agnostic model for different tasks. However, the task is defined to execute the pseudoinverse algorithm that relies on a task-specific degradation function and corresponding pseudoinverse transformation.

Figure 2B:
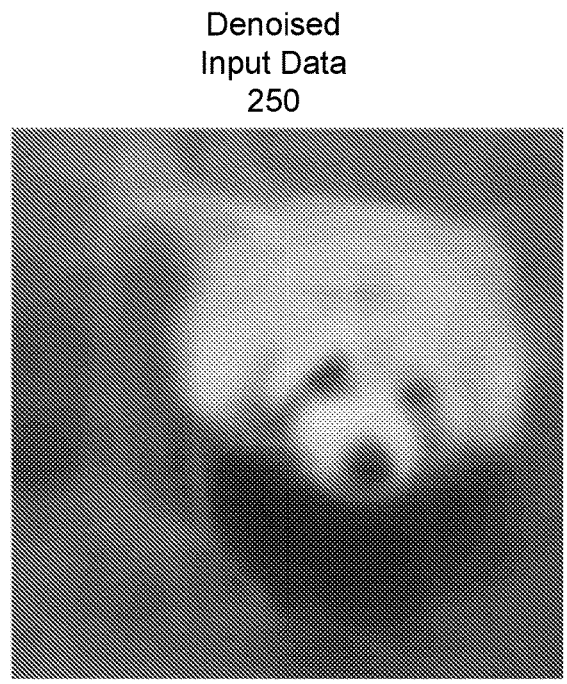
FIG. 2B illustrates denoised input data, degraded denoised input data, degraded reference data, and output data, in accordance with an embodiment.
Figure 2B:
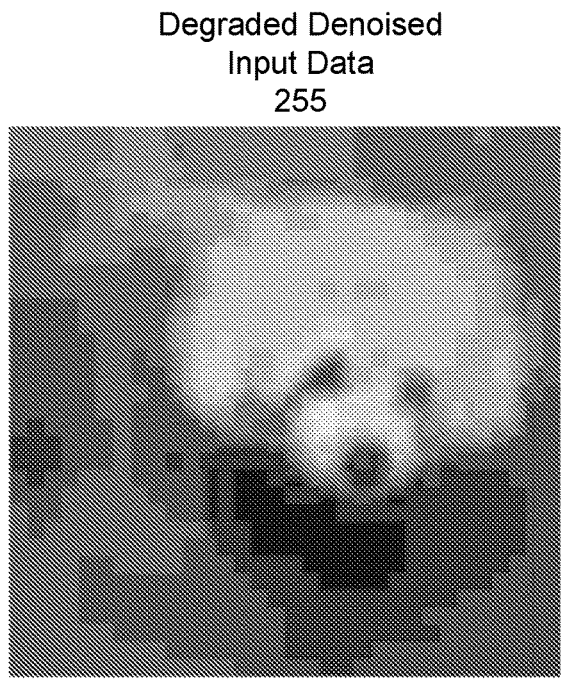
Figure 2B:
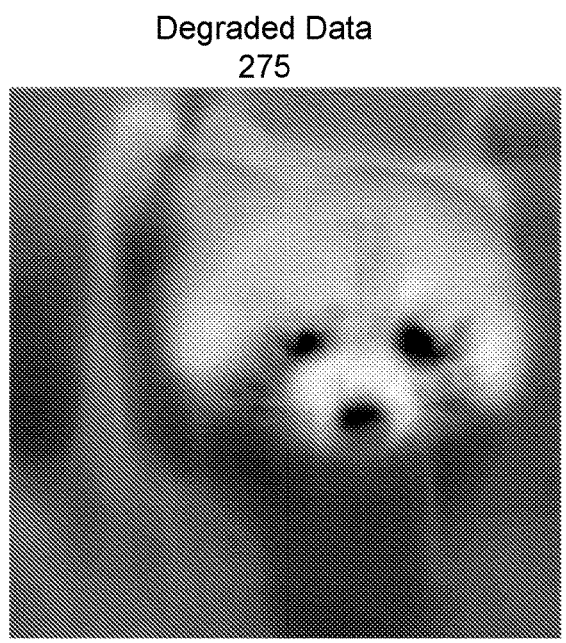
Figure 2B:

FIG. 2B illustrates denoised input data 250, degraded denoised input data 255, degraded data 275, and output data 280, in accordance with an embodiment. The denoised input data 250 is an example output $\hat{x}_t$ of the diffusion model 260. The degraded denoised input data 255 is an example of a result h($\hat{x}_t$) after applying the degradation function h to the denoised input data 250. For the images shown in FIG. 2B, the degradation function is JPEG encoding. The degraded data 275 is an example of y=h($x_0$), where y corresponds to applying the degradation function h to the reference data $x_0$. The pseudoinverse guidance computation unit 265 computes the vector $h^T$ (y)–$h^T$ (h($\hat{x}_t$)) and multiplies the vector by the Jacobian term to produce the VJP as the pseudoinverse guidance. The output data 280 is an example of the output data produced by the output image unit 270 using pseudoinverse guidance and the denoised input data 250. The output data that is generated by the data restoration system 200 may be provided as an input to the diffusion model 260 to iteratively improve the quality of the output data.

Figure 2C:
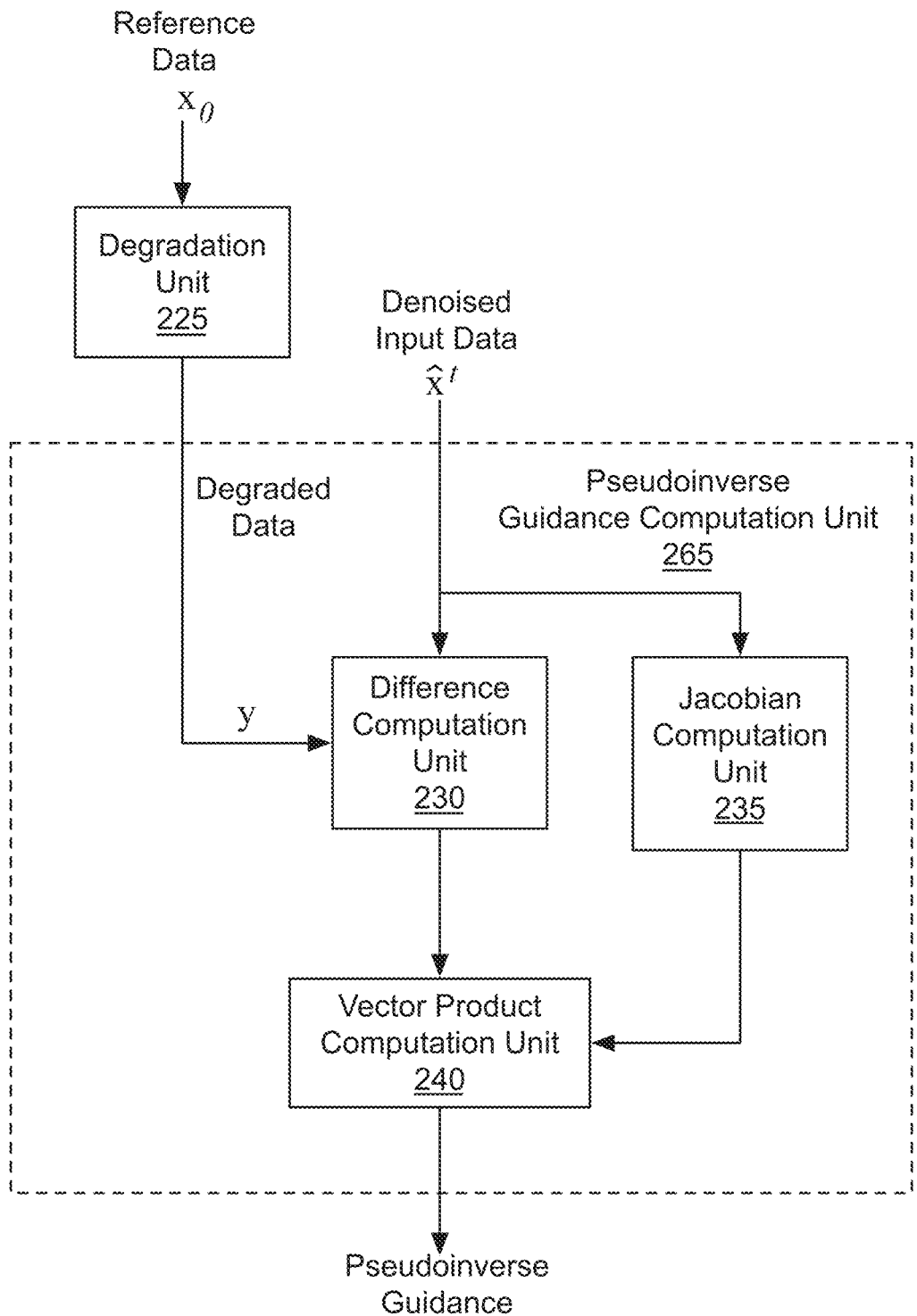
FIG. 2C illustrates a block diagram of the pseudoinverse guidance computation unit shown in FIG. 2A that is suitable for use in implementing some embodiments of the present disclosure.

FIG. 2C illustrates a block diagram of the pseudoinverse guidance computation unit 265 shown in FIG. 2A that is suitable for use in implementing some embodiments of the present disclosure. The pseudoinverse guidance computation unit 265 includes a difference computation unit 230, a Jacobian computation unit 235, and a vector product computation unit 240. Conceptually, a degradation unit 225 receives the reference data $x_0$ and applies a degradation function to the reference data to produce the degraded data y. In practice, the pseudoinverse guidance computation unit 265 within the data restoration system 200 receives the degraded data y as a degraded or noisy input to be restored.

The difference computation unit 230 receives y and the denoised input data $\hat{x}_t$ and computes the vector $h^T$ (y)–$h^T$ (h($\hat{x}_t$)). The Jacobian computation unit 235 also receives the denoised input data and computes the Jacobian term, which is a partial derivative of the denoised input data with respect to previous reconstructed output data $$\left(\frac{\partial \hat{x}_t}{\partial x_t}\right).$$

The vector product computation unit 240 receives the vector and the Jacobian term and multiples the vector and Jacobian term to produce the VJP as the pseudoinverse guidance.

The ability to model complex, high-dimensional distributions enables diffusion models to solve inverse problems, where the goal is to infer the underlying signal (reconstructed data) from measurements y. Conventional problem-agnostic diffusion models are trained for generative modeling but not trained on any specific inverse problem; solutions are obtained via a "plug-and-play" approach that combines the diffusion model and the measurement process, e.g., via Bayes' rule. These problem-agnostic diffusion models can easily adapt to different tasks without re-training the diffusion model but tend to perform worse than problem-specific diffusion models. Augmenting a diffusion model with pseudoinverse guidance improves the performance compared to either a problem agnostic diffusion model alone. Because the augmented diffusion model is problem agnostic, it can be used for a variety of reconstruction tasks which is advantageous compared with the problem-specific diffusion models.

To achieve the best of both techniques, pseudoinverse guidance uses problem-agnostic diffusion models to reach the empirical performance of problem-specific diffusion models. Conditioned on the measurements (y) and an explicit measurement model (H shown in Equation 1 below), pseudoinverse guidance estimates the problem-specific score function via Bayes' rule and uses the scores to draw samples. However, unlike classifier/classifier-free guidance, pseudoinverse guidance obtains the problem-specific score directly via the known measurement model, without training additional diffusion models. Intuitively, pseudoinverse guidance guides the diffusion process by matching a one-step denoising solution provided by denoised input data and the ground-truth measurements provided by the degraded data, after transforming both via a "pseudoinverse" of the measurement model. The pseudoinverse guidance provides an inverse problem solution that handles measurements with Gaussian noise, as well as some non-linear, non-differentiable measurement models, such as JPEG compression.

The reconstruction process relies on measurements $y \in \mathbb{R}^m$ of some signal $x_0 \in \mathbb{R}^n$, such that $$y = Hx_0 + z \qquad \text{Eq. (1)}$$

where $H \in \mathbb{R}^{n \times m}$ is the known measurement matrix (model), and $z \sim \mathcal{N}(0, \sigma_y^2 I)$ is an i.i.d. Gaussian noise vector with known dimension-wise standard deviation $\sigma_y$. The goal is to solve the inverse problem and recover the clean (high-quality) data $x_0 \in \mathbb{R}^n$ from the measurements, degraded data y.

Diffusion models can solve such inverse problems assuming that the problem-specific scores for all noise levels, i.e., $\nabla_{x_t} \log p_t(x_t|y)$, are available. While it is possible to train a conditional diffusion model for a specific H, it is computationally expensive to do this for a large family of problems, such as sparse reconstruction in medical imaging. Therefore, more commonly available problem-agnostic score models $S_\theta(x; \sigma_t)$ that are not trained specifically for the target inverse problem may be utilized. If the problem-specific scores $\nabla_{x_t} \log p_t(x_t|y)$ can be effectively approximated with $S_\theta(x_t; \sigma_t)$, the problem-specific scores can be used to solve the inverse problem.

Unfortunately, the problem-specific scores are intractable to compute, and therefore are approximated, as described further herein. The problem-specific score can be decomposed via Bayes' rule:

$$\nabla_{x_t} \log p_t(x_t|y) = \nabla_{x_t} \log p_t(x_t) + \nabla_{x_t} \log p_t(y|x_t), \qquad \text{Eq. (2)}$$

where the first term can be approximated with the score network $S_\theta(x_t; \sigma_t)$, the pre-trained diffusion model. The second term is a guidance term, namely the pseudoinverse guidance, which is the score of $p_t(y|x_t)$.

The score $\nabla_{x_t} \log p_t(y|x_t)$ may be efficiently estimates. The underlying graphical model for $x_0$, $x_t$, and y, which is $y \zeta x_0 \to x_t$; $x_t$ is produced by adding independent Gaussian noise to $x_0$, so $x_t$ is independent of the measurement y when conditioned on $x_0$. Therefore:

$$p_t(y|x_t) = \int_{x_0} p(x_0|x_t) p(y|x_0) dx_0, \qquad \text{Eq. (3)}$$

which involves a marginalization over $x_0$. The likelihood of $p(y|x_0)$ is tractable, yet samples from $p(x_0|x_t)$ can only be approximated by the diffusion model with high precision when $t \to T$, sampling from $p(x_0|x_t)$ essentially becomes sampling from the entire diffusion model. Even using Monte Carlo methods, it is computationally infeasible to estimate $p_t(y|x_t)$, let alone its score (where the Monte Carlo estimate will also be biased).

A solution is to use reasonable approximations to the true $p_t(x_0|x_t)$, such that the resulting approximation to the score $\nabla_{x_t} \log p_t(y|x_t)$ easy to compute. Intuitively, instead of representing $p(x_0|x_t)$ with the entire diffusion model from time t to 0, a one-step denoising process is used. Specifically, first $p_t(x_0|x_t)$ is approximated with the following Gaussian:

$$p_t(x_0|x_t) \approx \mathcal{N}(\hat{x}_t, r_t^2 I), \qquad \text{Eq. (4)}$$

where the mean is obtained from Tweedie's formula:

$$\hat{x}_t = \mathbb{E}[x_0|x_t] = x_t + \sigma_t^2 \nabla_{x_t} \log p_t(x_t) \approx x_t + \sigma_t^2 S_\theta(x; \sigma_t). \qquad \text{Eq. (5)}$$

Equation 5 represents the minimum mean squared error (MMSE) estimator of $x_0$ given $x_t$, and the noise standard deviation $\sigma_t$, and $r_t$ is a time-dependent standard deviation value that should depend on the data.

The next step is to approximate the score of $p_t(y|x_t)$. Since the measurement model obtains y by performing a linear transform on $x_0$ and adding independent Gaussian noise (Eq. 1), and $p_t(x_0|x_t)$ is Gaussian under the approximation (Eq. 4), the distribution of y conditioned on $x_t$ is also Gaussian under the approximation, as follows:

$$p_t(y|x_t) \approx N(H\hat{x}_t, r_t^2 HH^T + \sigma_t^2 I). \qquad \text{Eq. (6)}$$

$$\nabla_{x_t} \log p_t(y|x_t) \approx \left((y - H\hat{x}_t)^T (r_t^2 HH^T + \sigma_t^2 I)^{-1} H \frac{\partial \hat{x}_t}{\partial x_t}\right)^T. \qquad \text{Eq. (7)}$$

Equation (7) is the vector Jacobian product, where $$\frac{\partial \hat{x}_t}{\partial x_t}$$

is the Jacobian and the vector is $(y-H\hat{x}_t)^T (r_t^2 HH^T + \sigma_t^2 I)^{-1} H$. The VJP can be computed with backpropagation.

In many cases, we have that $\sigma_y = 0$, and thus, Equation 7 can be simplified to:

$$\nabla_{x_t} \log p_t(y|x_t) \approx r_t^{-2} \left((H^\dagger y - H^\dagger H\hat{x}_t)^T \frac{\partial \hat{x}_t}{\partial x_t}\right)^T; \qquad \text{Eq. (8)}$$

where for a matrix with linearly independent rows, $H^\dagger = H^T (HH^T)^{-1}$ is the Moore-Penrose pseudoinverse of H In the context of the present description, the term pseudoinverse guidance denotes the guidance method, which uses Equation 8 for noiseless measurements and Equation 7 for noisy linear measurements.

Notably, automatic differentiation is explicitly performed only through the score model, but not through the computational graph with H or $H^\dagger$. This allows pseudoinverse guidance to extend to degradation functions that are not necessarily linear or even differentiable. Furthermore, the matrix pseudoinverse satisfies $HH^\dagger Hx$ for all $x \in \mathcal{X}$. Analogously, for some non-linear function $h: \mathbb{R}^n \to \mathbb{R}^m$, a inverse function $h^\dagger: \mathbb{R}^m \to \mathbb{R}^n$ may be found such that $h(h^\dagger(h(x))) = h(x)$ for all $x \in \mathbb{R}^n$. Two examples are as follows:

Quantization Let $h(x) = \lfloor x \rfloor$ be the element-wise floor function of $x \in \mathbb{R}^n$. Then $h^\dagger(x) := x$ can be defined for all $x \in \mathcal{Z}$, and $h(h^\dagger(h(x)))$ is still the floor function.

JPEG encoding Let $h(x)$ be the JPEG encoding function, where quantization occurs after a discrete cosine transform operation. The corresponding JPEG decoding algorithm does not modify the values produced after quantization, so $h^\dagger(x)$ can be defined as the JPEG decoding algorithm.

This idea can also be applied to other measurement models, such as the formation of a low dynamic range image. The corresponding pseudoinverse guidance would then become:

$$\nabla_{x_t} \log p_t(y|x_t) \approx r_t^{-2} \left((h^\dagger(y) - h^\dagger(h(\hat{x}_t)))^T \frac{\partial \hat{x}_t}{\partial x_t}\right)^T \qquad \text{Eq. (9)}$$

which generalizes the linear case (Eq. 8) when h(x)=Hx and $h^\dagger(x)=H^\dagger x$ for all $x \in \mathbb{R}^n$.

Finally, a scalar weight may be introduced in front of the guidance term $\nabla_{x_t} \log p_t(y|x_t)$. However, unlike most conventional methods that apply a fixed weight for different diffusion times, a heuristic is introduced that implicitly adapts the guidance weights according to the timestep (iteration t). In an embodiment, $f(x_t; s, t, \eta)$ is used to denote the one step update using the problem-agnostic score model from time t to time s (assuming s<t), with $\eta \in [0,1]$ being a hyperparameter. A one-step sampling update from time t to time s with pseudoinverse guidance is:

$$x_s = f(x_t; s, t, \eta) + r_t^2 \nabla_{x_t} \log p_t(y|x_t). \qquad \text{Eq. (10)}$$

If the noiseless case in Eq. 9 is used, the one-step sampling update becomes:

$$x_s = f(x_t; s, t, \eta) + \left( (h^\dagger(y) - h^\dagger(h(\hat{x}_t)))^T \frac{\partial \hat{x}_t}{\partial x_t} \right)^T. \qquad \text{Eq. (11)}$$

The data restoration system 200 comprises a pseudoinverse-guided diffusion model that uses problem-agnostic models to close the gap in performance compared with conventional techniques. Conditional scores are directly estimated from the measurement model of the inverse problem without additional training. The data restoration system 200 can address inverse problems with noisy, non-linear, or even non-differentiable degradation functions, in contrast to many conventional approaches that are limited to noiseless linear degradation functions. In an embodiment, the data restoration system 200 performs several image restoration tasks, including super-resolution, inpainting and JPEG restoration. Performance of the data restoration system 200 is competitive with state-of-the-art diffusion models trained on specific tasks and, in contrast with conventional solutions, achieves the data restoration using a problem-agnostic diffusion model. Additionally, using pseudoinverse guidance can also solve a wider set of inverse problems where the measurement processes are composed of several simpler ones.

Using pseudoinverse guidance for data reconstruction is notably different from prior guidance-based methods in terms of how the conditional score $\nabla_{x_t} \log p_t(y|x_t)$ is approximated. Compared with classifier/classifier-free guidance, training on pairs of $(x_t, y)$ (noisy data and measurements) is unnecessary. Compared with reconstruction guidance, pseudoinverse guidance has three advantages. First, the approximation of $p(x_0|x_t)$ is consistent, i.e., it does not depend on the measurement model H. In contrast, conventional reconstruction guidance makes isotropic Gaussian assumptions on y. Second, in reconstruction guidance, the pseudoinverse $H^\dagger$ is replaced with matrix transpose $H^T$ which is different for linear H whose singular values are not either 0 or 1. Third, pseudoinverse guidance can be applied to noisy, non-linear, or non-differentiable measurement models.

Figure 3:
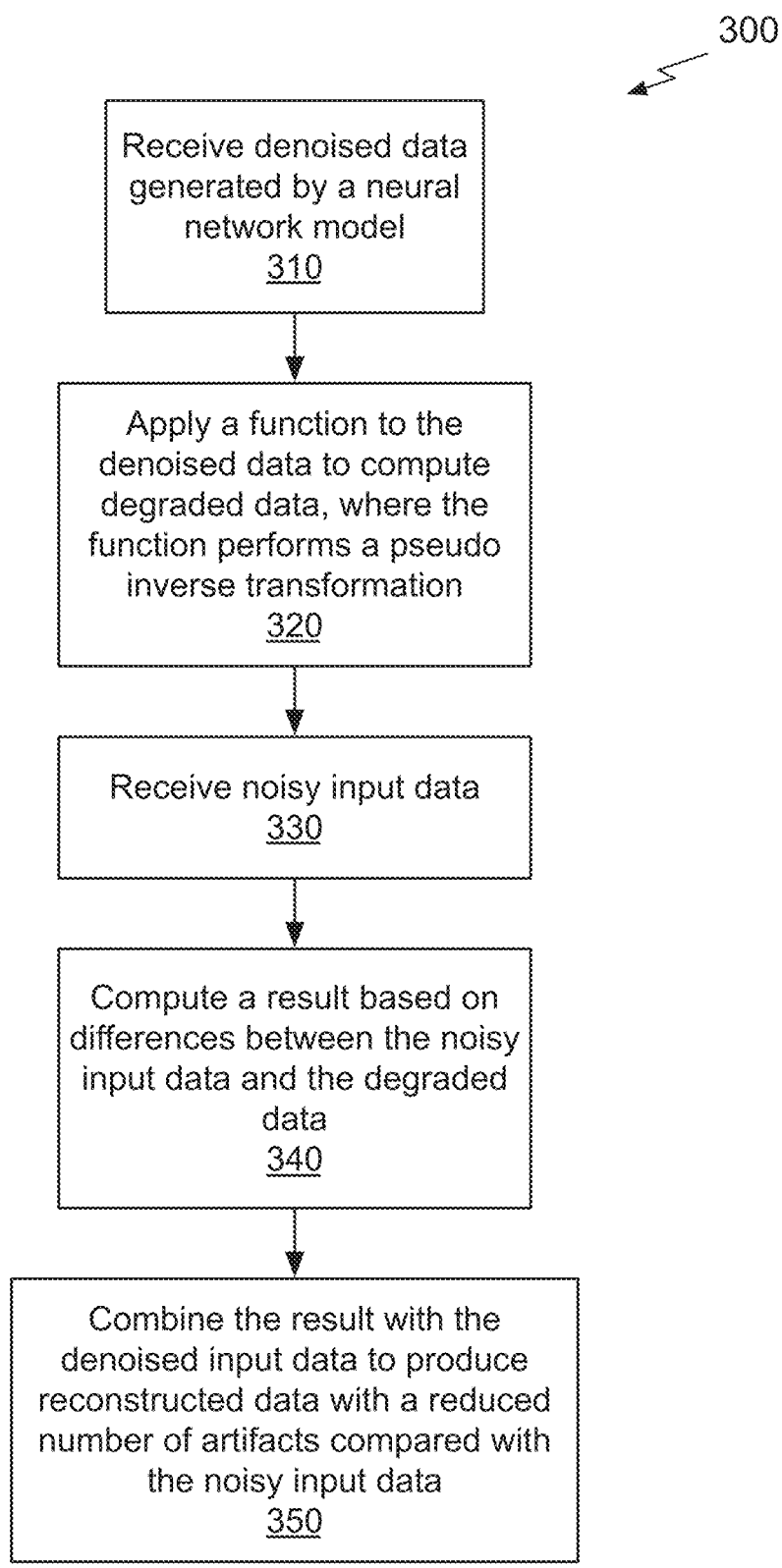
FIG. 3 illustrates a flowchart of a method for data restoration suitable for use in implementing some embodiments of the present disclosure.

FIG. 3 illustrates a flowchart of a method 300 for data restoration suitable for use in implementing some embodiments of the present disclosure. Each block of method 300, described herein, comprises a computing process that may be performed using any combination of hardware, firmware, and/or software. For instance, various functions may be carried out by a processor executing instructions stored in memory. The method may also be embodied as computer-usable instructions stored on computer storage media. The method may be provided by a standalone application, a service or hosted service (standalone or in combination with another hosted service), or a plug-in to another product, to name a few. In addition, method 300 is described, by way of example, with respect to the pseudoinverse guided data reconstruction system 200 of FIG. 2A. However, this method may additionally or alternatively be executed by any one system, or any combination of systems, including, but not limited to, those described herein. Furthermore, persons of ordinary skill in the art will understand that any system that performs method 300 is within the scope and spirit of embodiments of the present disclosure.

At step 310, denoised data generated by a neural network model is received. In an embodiment, the neural network model comprises the diffusion model 260. In an embodiment, the neural network model is pre-trained as a problem-agnostic denoising neural network model. In an embodiment, the neural network model processes Gaussian noise to generate the denoised data, such as $x_T$.

At step 320, a function is applied to the denoised data to compute degraded data, where the function performs a pseudoinverse transformation. In an embodiment, the function is JPEG encoding and the pseudoinverse of the function is JPEG decoding. In an embodiment, the function is resolution reduction and the pseudoinverse of the function is super resolution. In an embodiment, the function is masking and the pseudoinverse of the function is inpainting. In an embodiment, the function is non-differentiable.

At step 330, noisy input data is received. In an embodiment, the noisy input data comprises $y=h(x_0)$. In an embodiment, artifacts in the noisy input data result from applying the function to input data. In an embodiment, the noisy input data is acquired from a sensor. In an embodiment, the sensor captures an image. In an embodiment, the neural network model processes previous reconstructed data that approximates the noisy input data having a reduced number of artifacts to generate the denoised data.

At step 340, a result is computed based on differences between the noisy input data and the degraded data. In an embodiment, the result comprises the vector-Jacobian product. In an embodiment, computing the vector-Jacobian product comprises scaling a vector of the differences by a partial derivative of the denoised data with respect to previous reconstructed data $$\left( \frac{\partial \hat{x}_t}{\partial x_t} \right)$$

that approximates the noisy input data having a reduced number of artifacts.

At step 350, the result and the denoised data are combined to produce reconstructed data with a reduced number of artifacts compared with the noisy input data. In an embodiment, combining the vector-Jacobian product and the denoised data comprises accumulating the denoised data and the vector-Jacobian product.

The pseudoinverse-guided data restoration system 200 achieves competitive quality compared with conditional diffusion models while avoiding expensive problem-specific training. As a result, problem-agnostic diffusion models may be used as the diffusion model 260 to solve certain problems that would be cost-ineffective to address individually with conditional diffusion models, leading to a much wider set of applications. The ability to handle measurement noise also gives the pseudoinverse-guided data restoration system 200 the potential to address certain real-world applications, such as MRI imaging with Gaussian noise. In the image processing domain, the tasks may include, but are not limited to, image super-resolution (recover high-resolution images from low-resolution images), image deblurring (reduce blurring artifacts in images, such as optical blur and motion blur), JPEG artifact restoration (recover high-quality images from JPEG-compressed images), inpainting (recovering missing parts of an image), outpainting (semantic extension of the input image beyond its available content), denoising, colorization, computational tomography (recover images from computed tomography scans), magnetic resonance imaging (Mill) reconstruction, and astronomical interferometry. Inverse problem solvers are also applicable other domains such as video (video prediction, super-resolution, denoising, frame interpolation, inpainting), and representations of 3D data (three-dimensional reconstruction). Pseudoinverse guidance enables restoration of non-linear and/or non-differentiable tasks (such as JPEG encoding) as well as differentiable tasks - without requiring problem-specific training.

Parallel Processing Architecture

Figure 4:
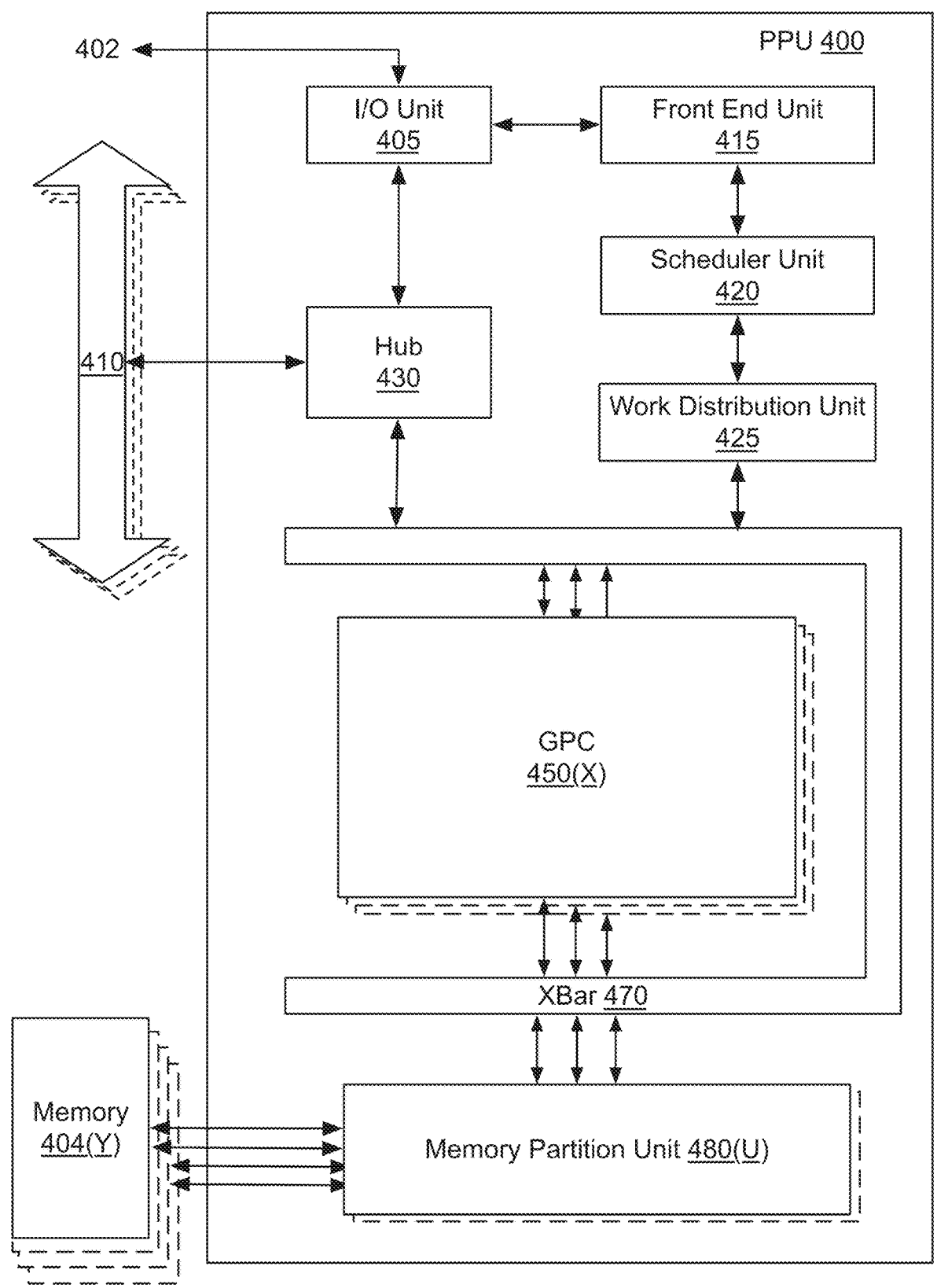
FIG. 4 illustrates an example parallel processing unit suitable for use in implementing some embodiments of the present disclosure.

FIG. 4 illustrates a parallel processing unit (PPU) 400, in accordance with an embodiment. The PPU 400 may be used to implement the data restoration system 200. The PPU 400 may be used to implement one or more of the diffusion model 260, pseudoinverse guidance computation unit 265, and output image unit 270 within the data restoration system 200. In an embodiment, a processor such as the PPU 400 may be configured to implement a neural network model. The neural network model may be implemented as software instructions executed by the processor or, in other embodiments, the processor can include a matrix of hardware elements configured to process a set of inputs (e.g., electrical signals representing values) to generate a set of outputs, which can represent activations of the neural network model. In yet other embodiments, the neural network model can be implemented as a combination of software instructions and processing performed by a matrix of hardware elements. Implementing the neural network model can include determining a set of parameters for the neural network model through, e.g., supervised or unsupervised training of the neural network model as well as, or in the alternative, performing inference using the set of parameters to process novel sets of inputs.

In an embodiment, the PPU 400 is a multi-threaded processor that is implemented on one or more integrated circuit devices. The PPU 400 is a latency hiding architecture designed to process many threads in parallel. A thread (e.g., a thread of execution) is an instantiation of a set of instructions configured to be executed by the PPU 400. In an embodiment, the PPU 400 is a graphics processing unit (GPU) configured to implement a graphics rendering pipeline for processing three-dimensional (3D) graphics data in order to generate two-dimensional (2D) image data for display on a display device. In other embodiments, the PPU 400 may be utilized for performing general-purpose computations. While one exemplary parallel processor is provided herein for illustrative purposes, it should be strongly noted that such processor is set forth for illustrative purposes only, and that any processor may be employed to supplement and/or substitute for the same.

One or more PPUs 400 may be configured to accelerate thousands of High Performance Computing (HPC), data center, cloud computing, and machine learning applications. The PPU 400 may be configured to accelerate numerous deep learning systems and applications for autonomous vehicles, simulation, computational graphics such as ray or path tracing, deep learning, high-accuracy speech, image, and text recognition systems, intelligent video analytics, molecular simulations, drug discovery, disease diagnosis, weather forecasting, big data analytics, astronomy, molecular dynamics simulation, financial modeling, robotics, factory automation, real-time language translation, online search optimizations, and personalized user recommendations, and the like.

As shown in FIG. 4, the PPU 400 includes an Input/Output (I/O) unit 405, a front end unit 415, a scheduler unit 420, a work distribution unit 425, a hub 430, a crossbar (Xbar) 470, one or more general processing clusters (GPCs) 450, and one or more memory partition units 480. The PPU 400 may be connected to a host processor or other PPUs 400 via one or more high-speed NVLink 410 interconnect. The PPU 400 may be connected to a host processor or other peripheral devices via an interconnect 402. The PPU 400 may also be connected to a local memory 404 comprising a number of memory devices. In an embodiment, the local memory may comprise a number of dynamic random access memory (DRAM) devices. The DRAM devices may be configured as a high-bandwidth memory (HBM) subsystem, with multiple DRAM dies stacked within each device.

The NVLink 410 interconnect enables systems to scale and include one or more PPUs 400 combined with one or more CPUs, supports cache coherence between the PPUs 400 and CPUs, and CPU mastering. Data and/or commands may be transmitted by the NVLink 410 through the hub 430 to/from other units of the PPU 400 such as one or more copy engines, a video encoder, a video decoder, a power management unit, etc. (not explicitly shown). The NVLink 410 is described in more detail in conjunction with FIG. 5B.

The I/O unit 405 is configured to transmit and receive communications (e.g., commands, data, etc.) from a host processor (not shown) over the interconnect 402. The I/O unit 405 may communicate with the host processor directly via the interconnect 402 or through one or more intermediate devices such as a memory bridge. In an embodiment, the I/O unit 405 may communicate with one or more other processors, such as one or more the PPUs 400 via the interconnect 402. In an embodiment, the I/O unit 405 implements a Peripheral Component Interconnect Express (PCIe) interface for communications over a PCIe bus and the interconnect 402 is a PCIe bus. In alternative embodiments, the I/O unit 405 may implement other types of well-known interfaces for communicating with external devices.

The I/O unit 405 decodes packets received via the interconnect 402. In an embodiment, the packets represent commands configured to cause the PPU 400 to perform various operations. The I/O unit 405 transmits the decoded commands to various other units of the PPU 400 as the commands may specify. For example, some commands may be transmitted to the front end unit 415. Other commands may be transmitted to the hub 430 or other units of the PPU 400 such as one or more copy engines, a video encoder, a video decoder, a power management unit, etc. (not explicitly shown). In other words, the I/O unit 405 is configured to route communications between and among the various logical units of the PPU 400.

In an embodiment, a program executed by the host processor encodes a command stream in a buffer that provides workloads to the PPU 400 for processing. A workload may comprise several instructions and data to be processed by those instructions. The buffer is a region in a memory that is accessible (e.g., read/write) by both the host processor and the PPU 400. For example, the I/O unit 405 may be configured to access the buffer in a system memory connected to the interconnect 402 via memory requests transmitted over the interconnect 402. In an embodiment, the host processor writes the command stream to the buffer and then transmits a pointer to the start of the command stream to the PPU 400. The front end unit 415 receives pointers to one or more command streams. The front end unit 415 manages the one or more streams, reading commands from the streams and forwarding commands to the various units of the PPU 400.

The front end unit 415 is coupled to a scheduler unit 420 that configures the various GPCs 450 to process tasks defined by the one or more streams. The scheduler unit 420 is configured to track state information related to the various tasks managed by the scheduler unit 420. The state may indicate which GPC 450 a task is assigned to, whether the task is active or inactive, a priority level associated with the task, and so forth. The scheduler unit 420 manages the execution of a plurality of tasks on the one or more GPCs 450.

The scheduler unit 420 is coupled to a work distribution unit 425 that is configured to dispatch tasks for execution on the GPCs 450. The work distribution unit 425 may track a number of scheduled tasks received from the scheduler unit 420. In an embodiment, the work distribution unit 425 manages a pending task pool and an active task pool for each of the GPCs 450. As a GPC 450 finishes the execution of a task, that task is evicted from the active task pool for the GPC 450 and one of the other tasks from the pending task pool is selected and scheduled for execution on the GPC 450. If an active task has been idle on the GPC 450, such as while waiting for a data dependency to be resolved, then the active task may be evicted from the GPC 450 and returned to the pending task pool while another task in the pending task pool is selected and scheduled for execution on the GPC 450.

In an embodiment, a host processor executes a driver kernel that implements an application programming interface (API) that enables one or more applications executing on the host processor to schedule operations for execution on the PPU 400. In an embodiment, multiple compute applications are simultaneously executed by the PPU 400 and the PPU 400 provides isolation, quality of service (QoS), and independent address spaces for the multiple compute applications. An application may generate instructions (e.g., API calls) that cause the driver kernel to generate one or more tasks for execution by the PPU 400. The driver kernel outputs tasks to one or more streams being processed by the PPU 400. Each task may comprise one or more groups of related threads, referred to herein as a warp. In an embodiment, a warp comprises 32 related threads that may be executed in parallel. Cooperating threads may refer to a plurality of threads including instructions to perform the task and that may exchange data through shared memory. The tasks may be allocated to one or more processing units within a GPC 450 and instructions are scheduled for execution by at least one warp.

The work distribution unit 425 communicates with the one or more GPCs 450 via XBar 470. The XBar 470 is an interconnect network that couples many of the units of the PPU 400 to other units of the PPU 400. For example, the XBar 470 may be configured to couple the work distribution unit 425 to a particular GPC 450. Although not shown explicitly, one or more other units of the PPU 400 may also be connected to the XBar 470 via the hub 430.

The tasks are managed by the scheduler unit 420 and dispatched to a GPC 450 by the work distribution unit 425. The GPC 450 is configured to process the task and generate results. The results may be consumed by other tasks within the GPC 450, routed to a different GPC 450 via the XBar 470, or stored in the memory 404. The results can be written to the memory 404 via the memory partition units 480, which implement a memory interface for reading and writing data to/from the memory 404. The results can be transmitted to another PPU 400 or CPU via the NVLink 410. In an embodiment, the PPU 400 includes a number U of memory partition units 480 that is equal to the number of separate and distinct memory devices of the memory 404 coupled to the PPU 400. Each GPC 450 may include a memory management unit to provide translation of virtual addresses into physical addresses, memory protection, and arbitration of memory requests. In an embodiment, the memory management unit provides one or more translation lookaside buffers (TLBs) for performing translation of virtual addresses into physical addresses in the memory 404.

In an embodiment, the memory partition unit 480 includes a Raster Operations (ROP) unit, a level two (L2) cache, and a memory interface that is coupled to the memory 404. The memory interface may implement 32, 64, 128, 1024-bit data buses, or the like, for high-speed data transfer. The PPU 400 may be connected to up to Y memory devices, such as high bandwidth memory stacks or graphics double-data-rate, version 5, synchronous dynamic random access memory, or other types of persistent storage. In an embodiment, the memory interface implements an HBM2 memory interface and Y equals half U. In an embodiment, the HBM2 memory stacks are located on the same physical package as the PPU 400, providing substantial power and area savings compared with conventional GDDR5 SDRAM systems. In an embodiment, each HBM2 stack includes four memory dies and Y equals 4, with each HBM 2 stack including two 128-bit channels per die for a total of 8 channels and a data bus width of 1024 bits.

In an embodiment, the memory 404 supports Single-Error Correcting Double-Error Detecting (SECDED) Error Correction Code (ECC) to protect data. ECC provides higher reliability for compute applications that are sensitive to data corruption. Reliability is especially important in large-scale cluster computing environments where PPUs 400 process very large datasets and/or run applications for extended periods.

In an embodiment, the PPU 400 implements a multi-level memory hierarchy. In an embodiment, the memory partition unit 480 supports a unified memory to provide a single unified virtual address space for CPU and PPU 400 memory, enabling data sharing between virtual memory systems. In an embodiment the frequency of accesses by a PPU 400 to memory located on other processors is traced to ensure that memory pages are moved to the physical memory of the PPU 400 that is accessing the pages more frequently. In an embodiment, the NVLink 410 supports address translation services allowing the PPU 400 to directly access a CPU's page tables and providing full access to CPU memory by the PPU 400.

In an embodiment, copy engines transfer data between multiple PPUs 400 or between PPUs 400 and CPUs. The copy engines can generate page faults for addresses that are not mapped into the page tables. The memory partition unit 480 can then service the page faults, mapping the addresses into the page table, after which the copy engine can perform the transfer. In a conventional system, memory is pinned (e.g., non-pageable) for multiple copy engine operations between multiple processors, substantially reducing the available memory. With hardware page faulting, addresses can be passed to the copy engines without worrying if the memory pages are resident, and the copy process is transparent.

Data from the memory 404 or other system memory may be fetched by the memory partition unit 480 and stored in the L2 cache 460, which is located on-chip and is shared between the various GPCs 450. As shown, each memory partition unit 480 includes a portion of the L2 cache associated with a corresponding memory 404. Lower level caches may then be implemented in various units within the GPCs 450. For example, each of the processing units within a GPC 450 may implement a level one (L1) cache. The L1 cache is private memory that is dedicated to a particular processing unit. The L2 cache 460 is coupled to the memory interface 470 and the XBar 470 and data from the L2 cache may be fetched and stored in each of the L1 caches for processing.

In an embodiment, the processing units within each GPC 450 implement a SIMD (Single-Instruction, Multiple-Data) architecture where each thread in a group of threads (e.g., a warp) is configured to process a different set of data based on the same set of instructions. All threads in the group of threads execute the same instructions. In another embodiment, the processing unit implements a SIMT (Single-Instruction, Multiple Thread) architecture where each thread in a group of threads is configured to process a different set of data based on the same set of instructions, but where individual threads in the group of threads are allowed to diverge during execution. In an embodiment, a program counter, call stack, and execution state is maintained for each warp, enabling concurrency between warps and serial execution within warps when threads within the warp diverge. In another embodiment, a program counter, call stack, and execution state is maintained for each individual thread, enabling equal concurrency between all threads, within and between warps. When execution state is maintained for each individual thread, threads executing the same instructions may be converged and executed in parallel for maximum efficiency.

Cooperative Groups is a programming model for organizing groups of communicating threads that allows developers to express the granularity at which threads are communicating, enabling the expression of richer, more efficient parallel decompositions. Cooperative launch APIs support synchronization amongst thread blocks for the execution of parallel algorithms. Conventional programming models provide a single, simple construct for synchronizing cooperating threads: a barrier across all threads of a thread block (e.g., the syncthreads( ) function). However, programmers would often like to define groups of threads at smaller than thread block granularities and synchronize within the defined groups to enable greater performance, design flexibility, and software reuse in the form of collective group-wide function interfaces.

Cooperative Groups enables programmers to define groups of threads explicitly at sub-block (e.g., as small as a single thread) and multi-block granularities, and to perform collective operations such as synchronization on the threads in a cooperative group. The programming model supports clean composition across software boundaries, so that libraries and utility functions can synchronize safely within their local context without having to make assumptions about convergence. Cooperative Groups primitives enable new patterns of cooperative parallelism, including producer-consumer parallelism, opportunistic parallelism, and global synchronization across an entire grid of thread blocks.

Each processing unit includes a large number (e.g., 128, etc.) of distinct processing cores (e.g., functional units) that may be fully-pipelined, single-precision, double-precision, and/or mixed precision and include a floating point arithmetic logic unit and an integer arithmetic logic unit. In an embodiment, the floating point arithmetic logic units implement the IEEE 754-2008 standard for floating point arithmetic. In an embodiment, the cores include 64 single-precision (32-bit) floating point cores, 64 integer cores, 32 double-precision (64-bit) floating point cores, and 8 tensor cores.

Tensor cores configured to perform matrix operations. In particular, the tensor cores are configured to perform deep learning matrix arithmetic, such as GEMM (matrix-matrix multiplication) for convolution operations during neural network training and inferencing. In an embodiment, each tensor core operates on a 4×4 matrix and performs a matrix multiply and accumulate operation $D=A\times B+C$, where A, B, C, and D are 4×4 matrices.

In an embodiment, the matrix multiply inputs A and B may be integer, fixed-point, or floating point matrices, while the accumulation matrices C and D may be integer, fixed-point, or floating point matrices of equal or higher bitwidths. In an embodiment, tensor cores operate on one, four, or eight bit integer input data with 32-bit integer accumulation. The 8-bit integer matrix multiply requires 1024 operations and results in a full precision product that is then accumulated using 32-bit integer addition with the other intermediate products for a 8×8×16 matrix multiply. In an embodiment, tensor Cores operate on 16-bit floating point input data with 32-bit floating point accumulation. The 16-bit floating point multiply requires 64 operations and results in a full precision product that is then accumulated using 32-bit floating point addition with the other intermediate products for a 4×4×4 matrix multiply. In practice, Tensor Cores are used to perform much larger two-dimensional or higher dimensional matrix operations, built up from these smaller elements. An API, such as CUDA 9 C++API, exposes specialized matrix load, matrix multiply and accumulate, and matrix store operations to efficiently use Tensor Cores from a CUDA-C++ program. At the CUDA level, the warp-level interface assumes 16×16 size matrices spanning all 32 threads of the warp.

Each processing unit may also comprise M special function units (SFUs) that perform special functions (e.g., attribute evaluation, reciprocal square root, and the like). In an embodiment, the SFUs may include a tree traversal unit configured to traverse a hierarchical tree data structure. In an embodiment, the SFUs may include texture unit configured to perform texture map filtering operations. In an embodiment, the texture units are configured to load texture maps (e.g., a 2D array of texels) from the memory 404 and sample the texture maps to produce sampled texture values for use in shader programs executed by the processing unit. In an embodiment, the texture maps are stored in shared memory that may comprise or include an L1 cache. The texture units implement texture operations such as filtering operations using mip-maps (e.g., texture maps of varying levels of detail). In an embodiment, each processing unit includes two texture units.

Each processing unit also comprises N load store units (LSUs) that implement load and store operations between the shared memory and the register file. Each processing unit includes an interconnect network that connects each of the cores to the register file and the LSU to the register file, shared memory. In an embodiment, the interconnect network is a crossbar that can be configured to connect any of the cores to any of the registers in the register file and connect the LSUs to the register file and memory locations in shared memory.

The shared memory is an array of on-chip memory that allows for data storage and communication between the processing units and between threads within a processing unit. In an embodiment, the shared memory comprises 128 KB of storage capacity and is in the path from each of the processing units to the memory partition unit 480. The shared memory can be used to cache reads and writes. One or more of the shared memory, L1 cache, L2 cache, and memory 404 are backing stores.

Combining data cache and shared memory functionality into a single memory block provides the best overall performance for both types of memory accesses. The capacity is usable as a cache by programs that do not use shared memory. For example, if shared memory is configured to use half of the capacity, texture and load/store operations can use the remaining capacity. Integration within the shared memory enables the shared memory to function as a high-throughput conduit for streaming data while simultaneously providing high-bandwidth and low-latency access to frequently reused data.

When configured for general purpose parallel computation, a simpler configuration can be used compared with graphics processing. Specifically, fixed function graphics processing units, are bypassed, creating a much simpler programming model. In the general purpose parallel computation configuration, the work distribution unit 425 assigns and distributes blocks of threads directly to the processing units within the GPCs 450. Threads execute the same program, using a unique thread ID in the calculation to ensure each thread generates unique results, using the processing unit(s) to execute the program and perform calculations, shared memory to communicate between threads, and the LSU to read and write global memory through the shared memory and the memory partition unit 480. When configured for general purpose parallel computation, the processing units can also write commands that the scheduler unit 420 can use to launch new work on the processing units.

The PPUs 400 may each include, and/or be configured to perform functions of, one or more processing cores and/or components thereof, such as Tensor Cores (TCs), Tensor Processing Units (TPUs), Pixel Visual Cores (PVCs), Ray Tracing (RT) Cores, Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The PPU 400 may be included in a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, and the like. In an embodiment, the PPU 400 is embodied on a single semiconductor substrate. In another embodiment, the PPU 400 is included in a system-on-a-chip (SoC) along with one or more other devices such as additional PPUs 400, the memory 404, a reduced instruction set computer (RISC) CPU, a memory management unit (MMU), a digital-to-analog converter (DAC), and the like.

In an embodiment, the PPU 400 may be included on a graphics card that includes one or more memory devices. The graphics card may be configured to interface with a PCIe slot on a motherboard of a desktop computer. In yet another embodiment, the PPU 400 may be an integrated graphics processing unit (iGPU) or parallel processor included in the chipset of the motherboard. In yet another embodiment, the PPU 400 may be realized in reconfigurable hardware. In yet another embodiment, parts of the PPU 400 may be realized in reconfigurable hardware.

Exemplary Computing System

Systems with multiple GPUs and CPUs are used in a variety of industries as developers expose and leverage more parallelism in applications such as artificial intelligence computing. High-performance GPU-accelerated systems with tens to many thousands of compute nodes are deployed in data centers, research facilities, and supercomputers to solve ever larger problems. As the number of processing devices within the high-performance systems increases, the communication and data transfer mechanisms need to scale to support the increased bandwidth.

Figure 5A:
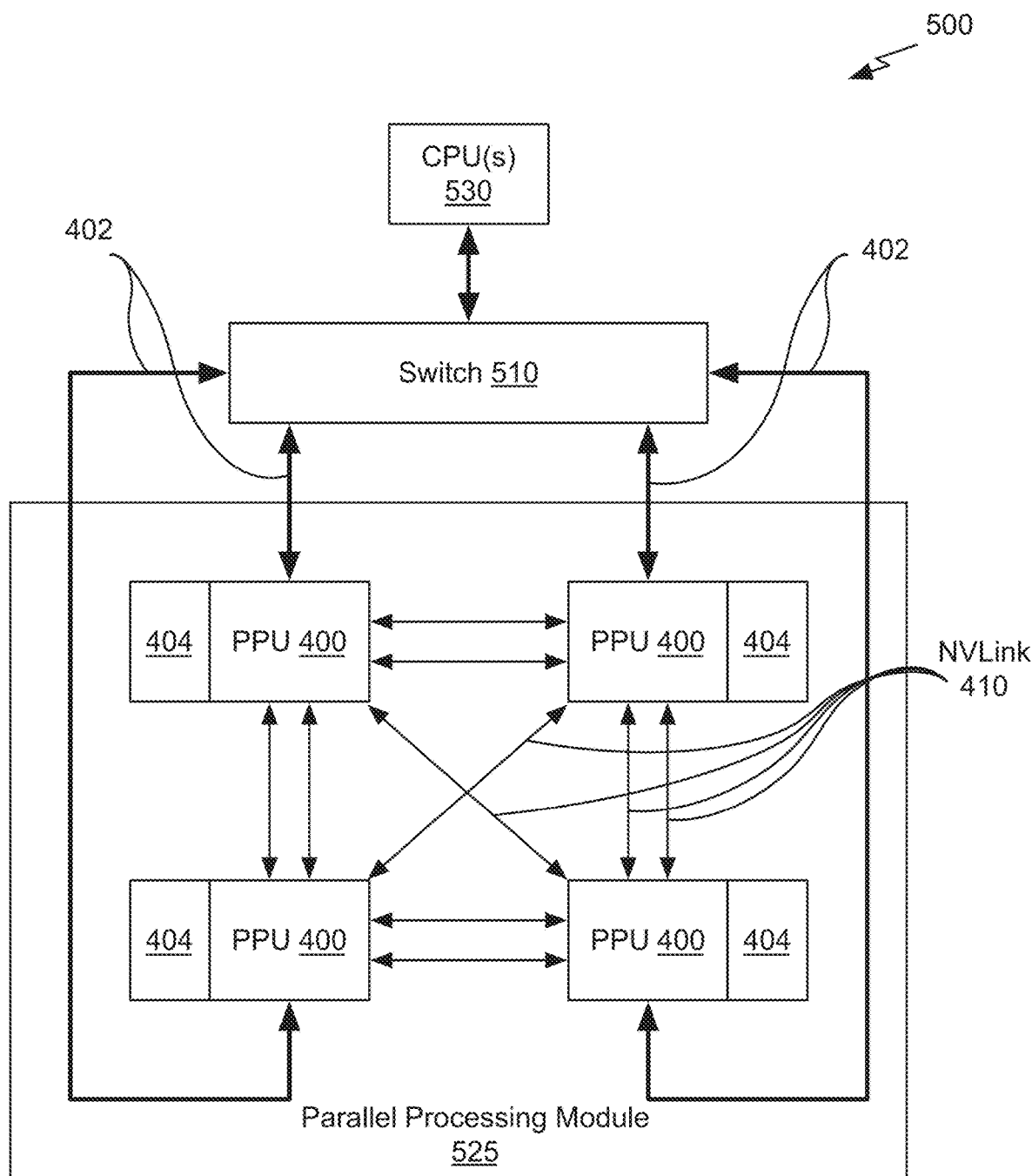
FIG. 5A is a conceptual diagram of a processing system implemented using the PPU of FIG. 4, suitable for use in implementing some embodiments of the present disclosure.

FIG. 5A is a conceptual diagram of a processing system 500 implemented using the PPU 400 of FIG. 4, in accordance with an embodiment. The exemplary system 500 may be configured to implement the method 300 shown in FIG. 3. The processing system 500 includes a CPU 530, switch 510, and multiple PPUs 400, and respective memories 404.

Figure 5B:
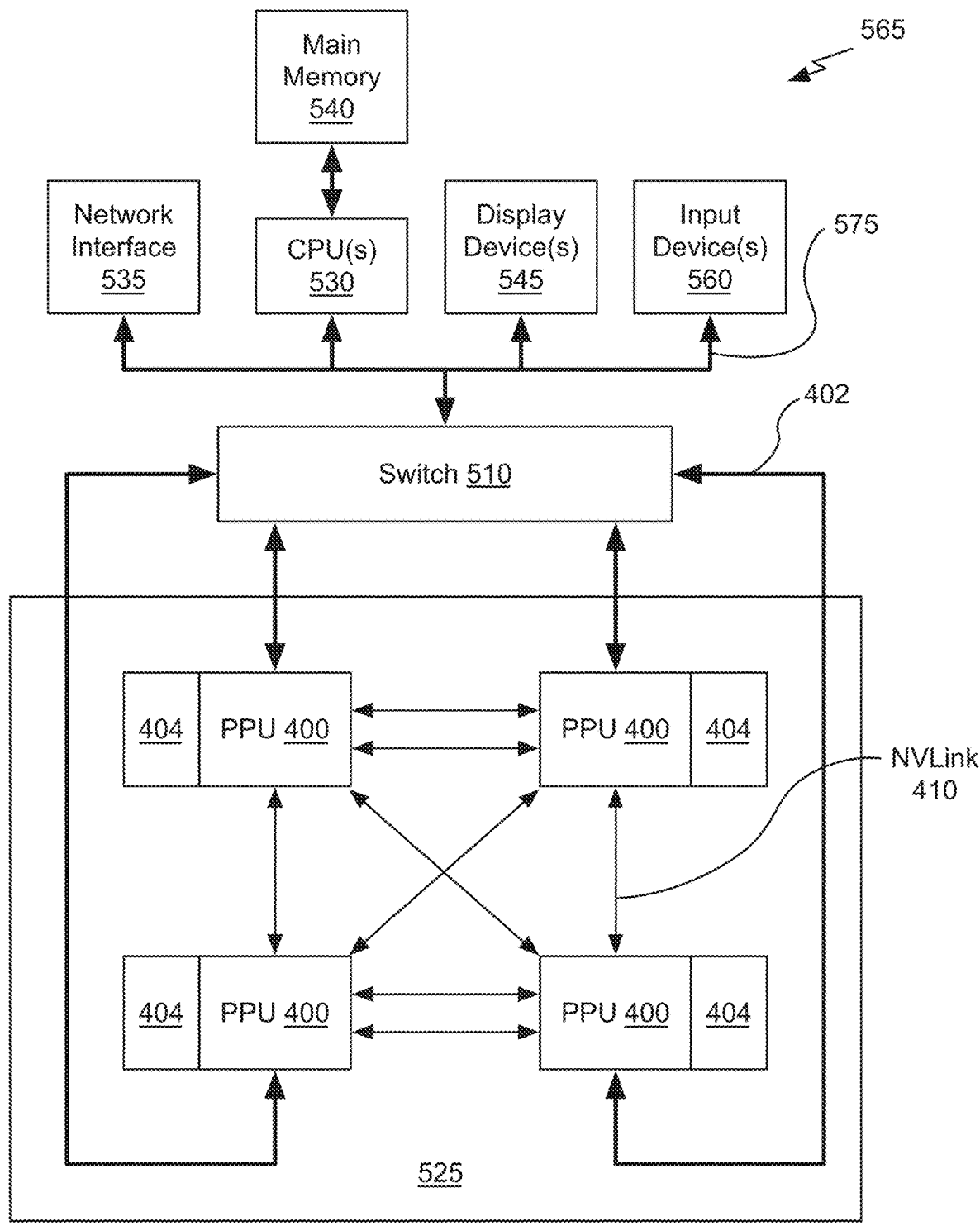
FIG. 5B illustrates an exemplary system in which the various architecture and/or functionality of the various previous embodiments may be implemented.

The NVLink 410 provides high-speed communication links between each of the PPUs 400. Although a particular number of NVLink 410 and interconnect 402 connections are illustrated in FIG. 5B, the number of connections to each PPU 400 and the CPU 530 may vary. The switch 510 interfaces between the interconnect 402 and the CPU 530. The PPUs 400, memories 404, and NVLinks 410 may be situated on a single semiconductor platform to form a parallel processing module 525. In an embodiment, the switch 510 supports two or more protocols to interface between various different connections and/or links.

In another embodiment (not shown), the NVLink 410 provides one or more high-speed communication links between each of the PPUs 400 and the CPU 530 and the switch 510 interfaces between the interconnect 402 and each of the PPUs 400. The PPUs 400, memories 404, and interconnect 402 may be situated on a single semiconductor platform to form a parallel processing module 525. In yet another embodiment (not shown), the interconnect 402 provides one or more communication links between each of the PPUs 400 and the CPU 530 and the switch 510 interfaces between each of the PPUs 400 using the NVLink 410 to provide one or more high-speed communication links between the PPUs 400. In another embodiment (not shown), the NVLink 410 provides one or more high-speed communication links between the PPUs 400 and the CPU 530 through the switch 510. In yet another embodiment (not shown), the interconnect 402 provides one or more communication links between each of the PPUs 400 directly. One or more of the NVLink 410 high-speed communication links may be implemented as a physical NVLink interconnect or either an on-chip or on-die interconnect using the same protocol as the NVLink 410.

In the context of the present description, a single semiconductor platform may refer to a sole unitary semiconductor-based integrated circuit fabricated on a die or chip. It should be noted that the term single semiconductor platform may also refer to multi-chip modules with increased connectivity which simulate on-chip operation and make substantial improvements over utilizing a conventional bus implementation. Of course, the various circuits or devices may also be situated separately or in various combinations of semiconductor platforms per the desires of the user. Alternately, the parallel processing module 525 may be implemented as a circuit board substrate and each of the PPUs 400 and/or memories 404 may be packaged devices. In an embodiment, the CPU 530, switch 510, and the parallel processing module 525 are situated on a single semiconductor platform.

In an embodiment, the signaling rate of each NVLink 410 is 20 to 25 Gigabits/second and each PPU 400 includes six NVLink 410 interfaces (as shown in FIG. 5A, five NVLink 410 interfaces are included for each PPU 400). Each NVLink 410 provides a data transfer rate of 25 Gigabytes/second in each direction, with six links providing 400 Gigabytes/second. The NVLinks 410 can be used exclusively for PPU-to-PPU communication as shown in FIG. 5A, or some combination of PPU-to-PPU and PPU-to-CPU, when the CPU 530 also includes one or more NVLink 410 interfaces.

In an embodiment, the NVLink 410 allows direct load/store/atomic access from the CPU 530 to each PPU's 400 memory 404. In an embodiment, the NVLink 410 supports coherency operations, allowing data read from the memories 404 to be stored in the cache hierarchy of the CPU 530, reducing cache access latency for the CPU 530. In an embodiment, the NVLink 410 includes support for Address Translation Services (ATS), allowing the PPU 400 to directly access page tables within the CPU 530. One or more of the NVLinks 410 may also be configured to operate in a low-power mode.

FIG. 5B illustrates an exemplary system 565 in which the various architecture and/or functionality of the various previous embodiments may be implemented. The exemplary system 565 may be configured to implement the method 300 shown in FIG. 3. As shown, a system 565 is provided including at least one central processing unit 530 that is connected to a communication bus 575. The communication bus 575 may directly or indirectly couple one or more of the following devices: main memory 540, network interface 535, CPU(s) 530, display device(s) 545, input device(s) 560, switch 510, and parallel processing system 525. The communication bus 575 may be implemented using any suitable protocol and may represent one or more links or busses, such as an address bus, a data bus, a control bus, or a combination thereof. The communication bus 575 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, HyperTransport, and/or another type of bus or link. In some embodiments, there are direct connections between components. As an example, the CPU(s) 530 may be directly connected to the main memory 540. Further, the CPU(s) 530 may be directly connected to the parallel processing system 525. Where there is direct, or point-to-point connection between components, the communication bus 575 may include a PCIe link to carry out the connection. In these examples, a PCI bus need not be included in the system 565.

Although the various blocks of FIG. 5B are shown as connected via the communication bus 575 with lines, this is not intended to be limiting and is for clarity only. For example, in some embodiments, a presentation component, such as display device(s) 545, may be considered an I/O component, such as input device(s) 560 (e.g., if the display is a touch screen). As another example, the CPU(s) 530 and/or parallel processing system 525 may include memory (e.g., the main memory 540 may be representative of a storage device in addition to the parallel processing system 525, the CPUs 530, and/or other components). In other words, the computing device of FIG. 5B is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 5B.

The system 565 also includes a main memory 540. Control logic (software) and data are stored in the main memory 540 which may take the form of a variety of computer-readable media. The computer-readable media may be any available media that may be accessed by the system 565. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the main memory 540 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by system 565. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

Computer programs, when executed, enable the system 565 to perform various functions. The CPU(s) 530 may be configured to execute at least some of the computer-readable instructions to control one or more components of the system 565 to perform one or more of the methods and/or processes described herein. The CPU(s) 530 may each include one or more cores (e.g., one, two, four, eight, twenty-eight, seventy-two, etc.) that are capable of handling a multitude of software threads simultaneously. The CPU(s) 530 may include any type of processor, and may include different types of processors depending on the type of system 565 implemented (e.g., processors with fewer cores for mobile devices and processors with more cores for servers). For example, depending on the type of system 565, the processor may be an Advanced RISC Machines (ARM) processor implemented using Reduced Instruction Set Computing (RISC) or an x86 processor implemented using Complex Instruction Set Computing (CISC). The system 565 may include one or more CPUs 530 in addition to one or more microprocessors or supplementary co-processors, such as math co-processors.

In addition to or alternatively from the CPU(s) 530, the parallel processing module 525 may be configured to execute at least some of the computer-readable instructions to control one or more components of the system 565 to perform one or more of the methods and/or processes described herein. The parallel processing module 525 may be used by the system 565 to render graphics (e.g., 3D graphics) or perform general purpose computations. For example, the parallel processing module 525 may be used for General-Purpose computing on GPUs (GPGPU). In embodiments, the CPU(s) 530 and/or the parallel processing module 525 may discretely or jointly perform any combination of the methods, processes and/or portions thereof The system 565 also includes input device(s) 560, the parallel processing system 525, and display device(s) 545. The display device(s) 545 may include a display (e.g., a monitor, a touch screen, a television screen, a heads-up-display (HUD), other display types, or a combination thereof), speakers, and/or other presentation components. The display device(s) 545 may receive data from other components (e.g., the parallel processing system 525, the CPU(s) 530, etc.), and output the data (e.g., as an image, video, sound, etc.).

The network interface 535 may enable the system 565 to be logically coupled to other devices including the input devices 560, the display device(s) 545, and/or other components, some of which may be built in to (e.g., integrated in) the system 565. Illustrative input devices 560 include a microphone, mouse, keyboard, joystick, game pad, game controller, satellite dish, scanner, printer, wireless device, etc. The input devices 560 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the system 565. The system 565 may be include depth cameras, such as stereoscopic camera systems, infrared camera systems, RGB camera systems, touchscreen technology, and combinations of these, for gesture detection and recognition. Additionally, the system 565 may include accelerometers or gyroscopes (e.g., as part of an inertia measurement unit (IMU)) that enable detection of motion. In some examples, the output of the accelerometers or gyroscopes may be used by the system 565 to render immersive augmented reality or virtual reality.

Further, the system 565 may be coupled to a network (e.g., a telecommunications network, local area network (LAN), wireless network, wide area network (WAN) such as the Internet, peer-to-peer network, cable network, or the like) through a network interface 535 for communication purposes. The system 565 may be included within a distributed network and/or cloud computing environment.

The network interface 535 may include one or more receivers, transmitters, and/or transceivers that enable the system 565 to communicate with other computing devices via an electronic communication network, included wired and/or wireless communications. The network interface 535 may be implemented as a network interface controller (NIC) that includes one or more data processing units (DPUs) to perform operations such as (for example and without limitation) packet parsing and accelerating network processing and communication. The network interface 535 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet.

The system 565 may also include a secondary storage (not shown). The secondary storage includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner. The system 565 may also include a hard-wired power supply, a battery power supply, or a combination thereof (not shown). The power supply may provide power to the system 565 to enable the components of the system 565 to operate.

Each of the foregoing modules and/or devices may even be situated on a single semiconductor platform to form the system 565. Alternately, the various modules may also be situated separately or in various combinations of semiconductor platforms per the desires of the user. While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the processing system 500 of FIG. 5A and/or exemplary system 565 of FIG. 5B—e.g., each device may include similar components, features, and/or functionality of the processing system 500 and/or exemplary system 565.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example processing system 500 of FIG. 5A and/or exemplary system 565 of FIG. 5B. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

Machine Learning

Deep neural networks (DNNs) developed on processors, such as the PPU 400 have been used for diverse use cases, from self-driving cars to faster drug development, from automatic image captioning in online image databases to smart real-time language translation in video chat applications. Deep learning is a technique that models the neural learning process of the human brain, continually learning, continually getting smarter, and delivering more accurate results more quickly over time. A child is initially taught by an adult to correctly identify and classify various shapes, eventually being able to identify shapes without any coaching. Similarly, a deep learning or neural learning system needs to be trained in object recognition and classification for it get smarter and more efficient at identifying basic objects, occluded objects, etc., while also assigning context to objects.

At the simplest level, neurons in the human brain look at various inputs that are received, importance levels are assigned to each of these inputs, and output is passed on to other neurons to act upon. An artificial neuron or perceptron is the most basic model of a neural network. In one example, a perceptron may receive one or more inputs that represent various features of an object that the perceptron is being trained to recognize and classify, and each of these features is assigned a certain weight based on the importance of that feature in defining the shape of an object.

A deep neural network (DNN) model includes multiple layers of many connected nodes (e.g., perceptrons, Boltzmann machines, radial basis functions, convolutional layers, etc.) that can be trained with enormous amounts of input data to quickly solve complex problems with high accuracy. In one example, a first layer of the DNN model breaks down an input image of an automobile into various sections and looks for basic patterns such as lines and angles. The second layer assembles the lines to look for higher level patterns such as wheels, windshields, and mirrors. The next layer identifies the type of vehicle, and the final few layers generate a label for the input image, identifying the model of a specific automobile brand.

Once the DNN is trained, the DNN can be deployed and used to identify and classify objects or patterns in a process known as inference. Examples of inference (the process through which a DNN extracts useful information from a given input) include identifying handwritten numbers on checks deposited into ATM machines, identifying images of friends in photos, delivering movie recommendations to over fifty million users, identifying and classifying different types of automobiles, pedestrians, and road hazards in driverless cars, or translating human speech in real-time.

During training, data flows through the DNN in a forward propagation phase until a prediction is produced that indicates a label corresponding to the input. If the neural network does not correctly label the input, then errors between the correct label and the predicted label are analyzed, and the weights are adjusted for each feature during a backward propagation phase until the DNN correctly labels the input and other inputs in a training dataset. Training complex neural networks requires massive amounts of parallel computing performance, including floating-point multiplications and additions that are supported by the PPU 400. Inferencing is less compute-intensive than training, being a latency-sensitive process where a trained neural network is applied to new inputs it has not seen before to classify images, detect emotions, identify recommendations, recognize and translate speech, and generally infer new information.

Neural networks rely heavily on matrix math operations, and complex multi-layered networks require tremendous amounts of floating-point performance and bandwidth for both efficiency and speed. With thousands of processing cores, optimized for matrix math operations, and delivering tens to hundreds of TFLOPS of performance, the PPU 400 is a computing platform capable of delivering performance required for deep neural network-based artificial intelligence and machine learning applications.

Furthermore, images generated applying one or more of the techniques disclosed herein may be used to train, test, or certify DNNs used to recognize objects and environments in the real world. Such images may include scenes of roadways, factories, buildings, urban settings, rural settings, humans, animals, and any other physical object or real-world setting. Such images may be used to train, test, or certify DNNs that are employed in machines or robots to manipulate, handle, or modify physical objects in the real world. Furthermore, such images may be used to train, test, or certify DNNs that are employed in autonomous vehicles to navigate and move the vehicles through the real world. Additionally, images generated applying one or more of the techniques disclosed herein may be used to convey information to users of such machines, robots, and vehicles.

Figure 5C:
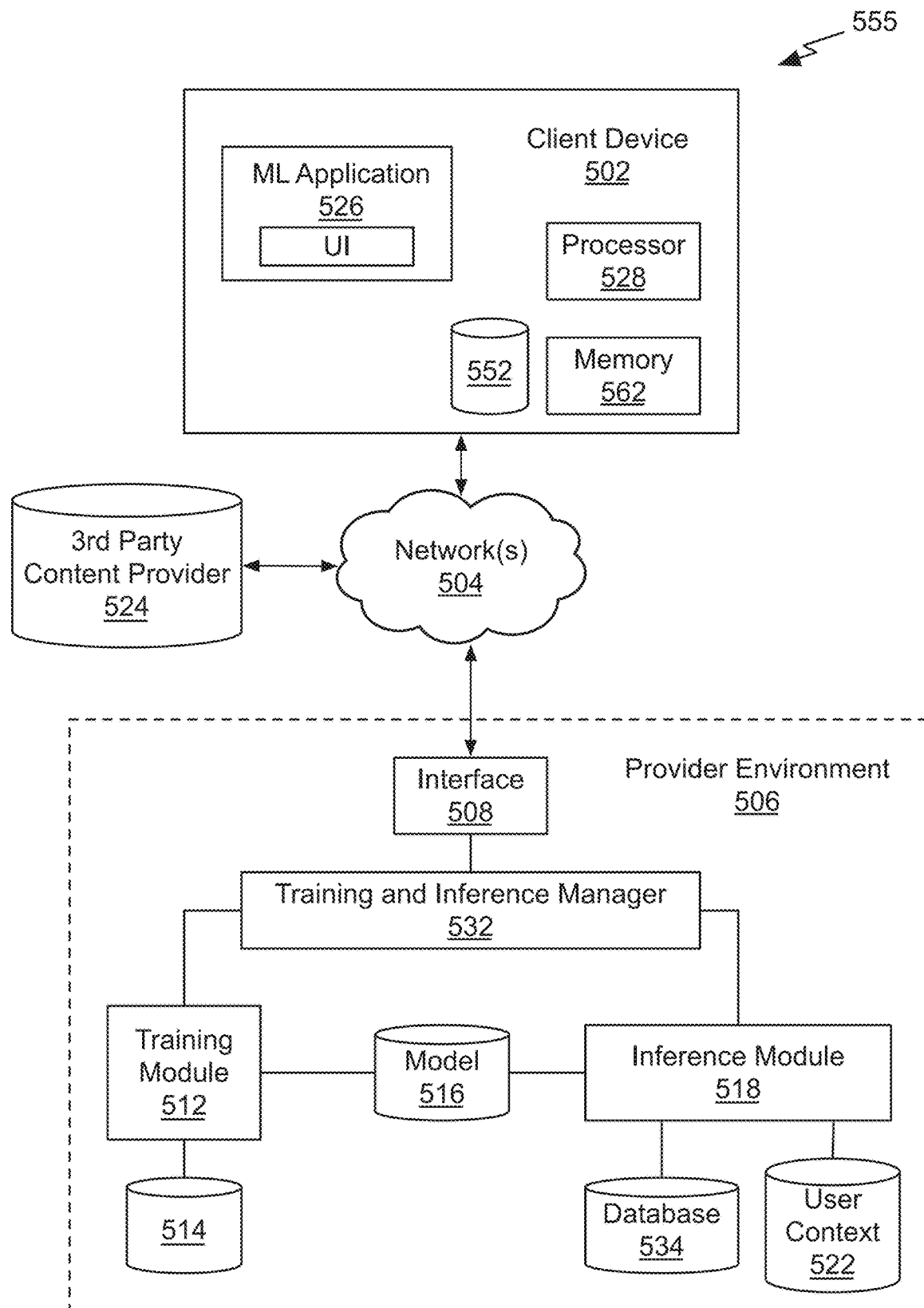
FIG. 5C illustrates components of an exemplary system that can be used to train and utilize machine learning, in at least one embodiment.

FIG. 5C illustrates components of an exemplary system 555 that can be used to train and utilize machine learning, in accordance with at least one embodiment. As will be discussed, various components can be provided by various combinations of computing devices and resources, or a single computing system, which may be under control of a single entity or multiple entities. Further, aspects may be triggered, initiated, or requested by different entities. In at least one embodiment training of a neural network might be instructed by a provider associated with provider environment 506, while in at least one embodiment training might be requested by a customer or other user having access to a provider environment through a client device 502 or other such resource. In at least one embodiment, training data (or data to be analyzed by a trained neural network) can be provided by a provider, a user, or a third party content provider 524. In at least one embodiment, client device 502 may be a vehicle or object that is to be navigated on behalf of a user, for example, which can submit requests and/or receive instructions that assist in navigation of a device.

In at least one embodiment, requests are able to be submitted across at least one network 504 to be received by a provider environment 506. In at least one embodiment, a client device may be any appropriate electronic and/or computing devices enabling a user to generate and send such requests, such as, but not limited to, desktop computers, notebook computers, computer servers, smartphones, tablet computers, gaming consoles (portable or otherwise), computer processors, computing logic, and set-top boxes. Network(s) 504 can include any appropriate network for transmitting a request or other such data, as may include Internet, an intranet, an Ethernet, a cellular network, a local area network (LAN), a wide area network (WAN), a personal area network (PAN), an ad hoc network of direct wireless connections among peers, and so on.

In at least one embodiment, requests can be received at an interface layer 508, which can forward data to a training and inference manager 532, in this example. The training and inference manager 532 can be a system or service including hardware and software for managing requests and service corresponding data or content, in at least one embodiment, the training and inference manager 532 can receive a request to train a neural network, and can provide data for a request to a training module 512. In at least one embodiment, training module 512 can select an appropriate model or neural network to be used, if not specified by the request, and can train a model using relevant training data. In at least one embodiment, training data can be a batch of data stored in a training data repository 514, received from client device 502, or obtained from a third party provider 524. In at least one embodiment, training module 512 can be responsible for training data. A neural network can be any appropriate network, such as a recurrent neural network (RNN) or convolutional neural network (CNN). Once a neural network is trained and successfully evaluated, a trained neural network can be stored in a model repository 516, for example, that may store different models or networks for users, applications, or services, etc. In at least one embodiment, there may be multiple models for a single application or entity, as may be utilized based on a number of different factors.

In at least one embodiment, at a subsequent point in time, a request may be received from client device 502 (or another such device) for content (e.g., path determinations) or data that is at least partially determined or impacted by a trained neural network. This request can include, for example, input data to be processed using a neural network to obtain one or more inferences or other output values, classifications, or predictions, or for at least one embodiment, input data can be received by interface layer 508 and directed to inference module 518, although a different system or service can be used as well. In at least one embodiment, inference module 518 can obtain an appropriate trained network, such as a trained deep neural network (DNN) as discussed herein, from model repository 516 if not already stored locally to inference module 518. Inference module 518 can provide data as input to a trained network, which can then generate one or more inferences as output. This may include, for example, a classification of an instance of input data. In at least one embodiment, inferences can then be transmitted to client device 502 for display or other communication to a user. In at least one embodiment, context data for a user may also be stored to a user context data repository 522, which may include data about a user which may be useful as input to a network in generating inferences, or determining data to return to a user after obtaining instances. In at least one embodiment, relevant data, which may include at least some of input or inference data, may also be stored to a local database 534 for processing future requests. In at least one embodiment, a user can use account information or other information to access resources or functionality of a provider environment. In at least one embodiment, if permitted and available, user data may also be collected and used to further train models, in order to provide more accurate inferences for future requests. In at least one embodiment, requests may be received through a user interface to a machine learning application 526 executing on client device 502, and results displayed through a same interface. A client device can include resources such as a processor 528 and memory 562 for generating a request and processing results or a response, as well as at least one data storage element 552 for storing data for machine learning application 526.

In at least one embodiment a processor 528 (or a processor of training module 512 or inference module 518) will be a central processing unit (CPU). As mentioned, however, resources in such environments can utilize GPUs to process data for at least certain types of requests. With thousands of cores, GPUs, such as PPU 400 are designed to handle substantial parallel workloads and, therefore, have become popular in deep learning for training neural networks and generating predictions. While use of GPUs for offline builds has enabled faster training of larger and more complex models, generating predictions offline implies that either request-time input features cannot be used or predictions must be generated for all permutations of features and stored in a lookup table to serve real-time requests. If a deep learning framework supports a CPU-mode and a model is small and simple enough to perform a feed-forward on a CPU with a reasonable latency, then a service on a CPU instance could host a model. In this case, training can be done offline on a GPU and inference done in real-time on a CPU. If a CPU approach is not viable, then a service can run on a GPU instance. Because GPUs have different performance and cost characteristics than CPUs, however, running a service that offloads a runtime algorithm to a GPU can require it to be designed differently from a CPU based service.

In at least one embodiment, video data can be provided from client device 502 for enhancement in provider environment 506. In at least one embodiment, video data can be processed for enhancement on client device 502. In at least one embodiment, video data may be streamed from a third party content provider 524 and enhanced by third party content provider 524, provider environment 506, or client device 502. In at least one embodiment, video data can be provided from client device 502 for use as training data in provider environment 506.

In at least one embodiment, supervised and/or unsupervised training can be performed by the client device 502 and/or the provider environment 506. In at least one embodiment, a set of training data 514 (e.g., classified or labeled data) is provided as input to function as training data. In at least one embodiment, training data can include instances of at least one type of object for which a neural network is to be trained, as well as information that identifies that type of object. In at least one embodiment, training data might include a set of images that each includes a representation of a type of object, where each image also includes, or is associated with, a label, metadata, classification, or other piece of information identifying a type of object represented in a respective image. Various other types of data may be used as training data as well, as may include text data, audio data, video data, and so on. In at least one embodiment, training data 514 is provided as training input to a training module 512. In at least one embodiment, training module 512 can be a system or service that includes hardware and software, such as one or more computing devices executing a training application, for training a neural network (or other model or algorithm, etc.). In at least one embodiment, training module 512 receives an instruction or request indicating a type of model to be used for training, in at least one embodiment, a model can be any appropriate statistical model, network, or algorithm useful for such purposes, as may include an artificial neural network, deep learning algorithm, learning classifier, Bayesian network, and so on. In at least one embodiment, training module 512 can select an initial model, or other untrained model, from an appropriate repository 516 and utilize training data 514 to train a model, thereby generating a trained model (e.g., trained deep neural network) that can be used to classify similar types of data, or generate other such inferences. In at least one embodiment where training data is not used, an appropriate initial model can still be selected for training on input data per training module 512.

In at least one embodiment, a model can be trained in a number of different ways, as may depend in part upon a type of model selected. In at least one embodiment, a machine learning algorithm can be provided with a set of training data, where a model is a model artifact created by a training process. In at least one embodiment, each instance of training data contains a correct answer (e.g., classification), which can be referred to as a target or target attribute. In at least one embodiment, a learning algorithm finds patterns in training data that map input data attributes to a target, an answer to be predicted, and a machine learning model is output that captures these patterns. In at least one embodiment, a machine learning model can then be used to obtain predictions on new data for which a target is not specified.

In at least one embodiment, training and inference manager 532 can select from a set of machine learning models including binary classification, multiclass classification, generative, and regression models. In at least one embodiment, a type of model to be used can depend at least in part upon a type of target to be predicted.

Graphics Processing Pipeline

In an embodiment, the PPU 400 comprises a graphics processing unit (GPU). The PPU 400 is configured to receive commands that specify shader programs for processing graphics data. Graphics data may be defined as a set of primitives such as points, lines, triangles, quads, triangle strips, and the like. Typically, a primitive includes data that specifies a number of vertices for the primitive (e.g., in a model-space coordinate system) as well as attributes associated with each vertex of the primitive. The PPU 400 can be configured to process the graphics primitives to generate a frame buffer (e.g., pixel data for each of the pixels of the display).

An application writes model data for a scene (e.g., a collection of vertices and attributes) to a memory such as a system memory or memory 404. The model data defines each of the objects that may be visible on a display. The application then makes an API call to the driver kernel that requests the model data to be rendered and displayed. The driver kernel reads the model data and writes commands to the one or more streams to perform operations to process the model data. The commands may reference different shader programs to be implemented on the processing units within the PPU 400 including one or more of a vertex shader, hull shader, domain shader, geometry shader, and a pixel shader. For example, one or more of the processing units may be configured to execute a vertex shader program that processes a number of vertices defined by the model data. In an embodiment, the different processing units may be configured to execute different shader programs concurrently. For example, a first subset of processing units may be configured to execute a vertex shader program while a second subset of processing units may be configured to execute a pixel shader program. The first subset of processing units processes vertex data to produce processed vertex data and writes the processed vertex data to the L2 cache 460 and/or the memory 404. After the processed vertex data is rasterized (e.g., transformed from three-dimensional data into two-dimensional data in screen space) to produce fragment data, the second subset of processing units executes a pixel shader to produce processed fragment data, which is then blended with other processed fragment data and written to the frame buffer in memory 404. The vertex shader program and pixel shader program may execute concurrently, processing different data from the same scene in a pipelined fashion until all of the model data for the scene has been rendered to the frame buffer. Then, the contents of the frame buffer are transmitted to a display controller for display on a display device.

The graphics processing pipeline may be implemented via an application executed by a host processor, such as a CPU. In an embodiment, a device driver may implement an application programming interface (API) that defines various functions that can be utilized by an application in order to generate graphical data for display. The device driver is a software program that includes a plurality of instructions that control the operation of the PPU 400. The API provides an abstraction for a programmer that lets a programmer utilize specialized graphics hardware, such as the PPU 400, to generate the graphical data without requiring the programmer to utilize the specific instruction set for the PPU 400. The application may include an API call that is routed to the device driver for the PPU 400. The device driver interprets the API call and performs various operations to respond to the API call. In some instances, the device driver may perform operations by executing instructions on the CPU. In other instances, the device driver may perform operations, at least in part, by launching operations on the PPU 400 utilizing an input/output interface between the CPU and the PPU 400. In an embodiment, the device driver is configured to implement the graphics processing pipeline utilizing the hardware of the PPU 400.

Images generated applying one or more of the techniques disclosed herein may be displayed on a monitor or other display device. In some embodiments, the display device may be coupled directly to the system or processor generating or rendering the images. In other embodiments, the display device may be coupled indirectly to the system or processor such as via a network. Examples of such networks include the Internet, mobile telecommunications networks, a WIFI network, as well as any other wired and/or wireless networking system. When the display device is indirectly coupled, the images generated by the system or processor may be streamed over the network to the display device. Such streaming allows, for example, video games or other applications, which render images, to be executed on a server, a data center, or in a cloud-based computing environment and the rendered images to be transmitted and displayed on one or more user devices (such as a computer, video game console, smartphone, other mobile device, etc.) that are physically separate from the server or data center. Hence, the techniques disclosed herein can be applied to enhance the images that are streamed and to enhance services that stream images such as NVIDIA GeForce Now (GFN), Google Stadia, and the like.

Example Streaming System

Figure 6:
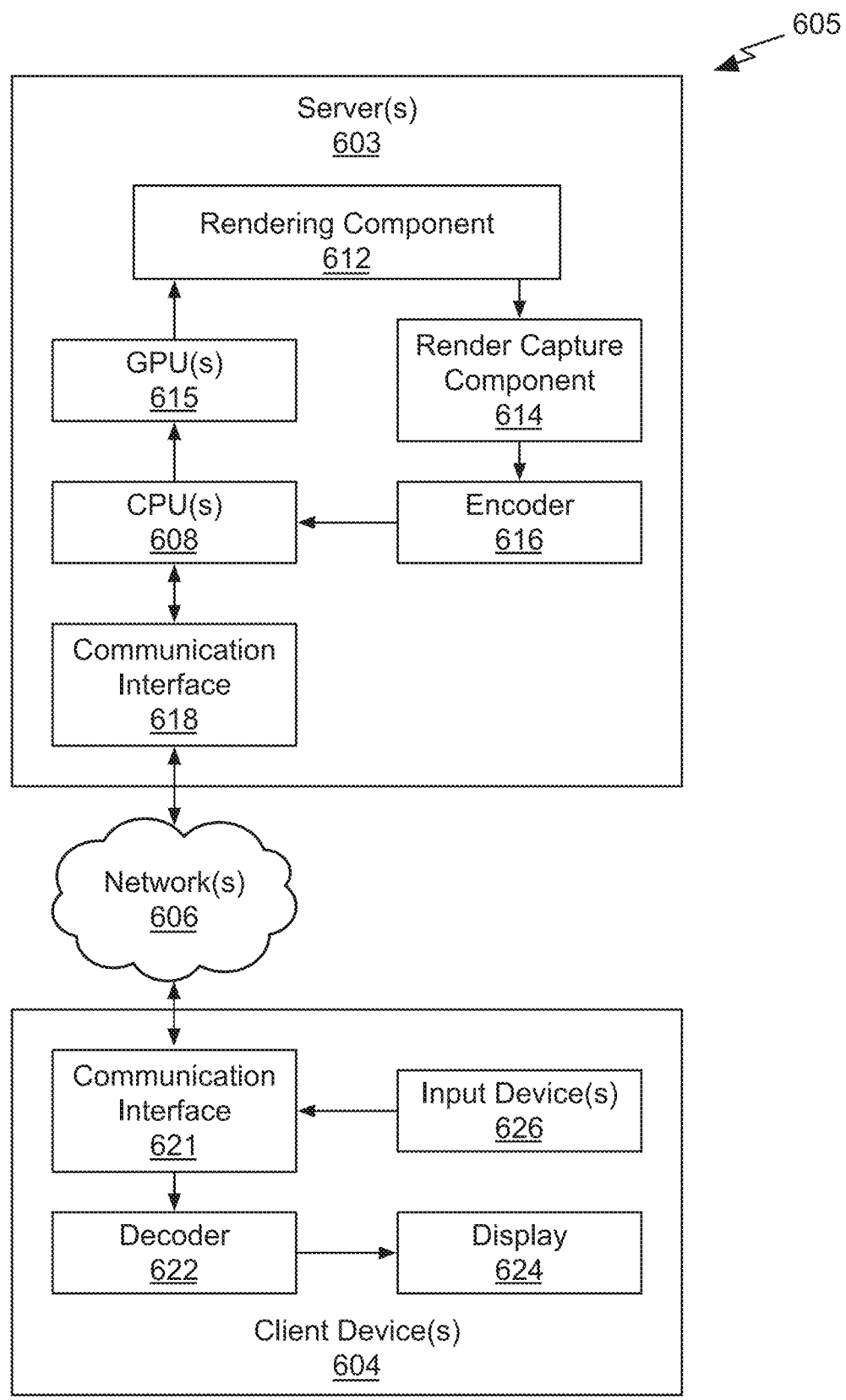
FIG. 6 illustrates an exemplary streaming system suitable for use in implementing some embodiments of the present disclosure.

FIG. 6 is an example system diagram for a streaming system 605, in accordance with some embodiments of the present disclosure. FIG. 6 includes server(s) 603 (which may include similar components, features, and/or functionality to the example processing system 500 of FIG. 5A and/or exemplary system 565 of FIG. 5B), client device(s) 604 (which may include similar components, features, and/or functionality to the example processing system 500 of FIG. 5A and/or exemplary system 565 of FIG. 5B), and network(s) 606 (which may be similar to the network(s) described herein). In some embodiments of the present disclosure, the system 605 may be implemented.

In an embodiment, the streaming system 605 is a game streaming system and the server(s) 603 are game server(s). In the system 605, for a game session, the client device(s) 604 may only receive input data in response to inputs to the input device(s) 626, transmit the input data to the server(s) 603, receive encoded display data from the server(s) 603, and display the display data on the display 624. As such, the more computationally intense computing and processing is offloaded to the server(s) 603 (e.g., rendering—in particular ray or path tracing—for graphical output of the game session is executed by the GPU(s) 615 of the server(s) 603 ). In other words, the game session is streamed to the client device(s) 604 from the server(s) 603, thereby reducing the requirements of the client device(s) 604 for graphics processing and rendering.

For example, with respect to an instantiation of a game session, a client device 604 may be displaying a frame of the game session on the display 624 based on receiving the display data from the server(s) 603. The client device 604 may receive an input to one of the input device(s) 626 and generate input data in response. The client device 604 may transmit the input data to the server(s) 603 via the communication interface 621 and over the network(s) 606 (e.g., the Internet), and the server(s) 603 may receive the input data via the communication interface 618. The CPU(s) 608 may receive the input data, process the input data, and transmit data to the GPU(s) 615 that causes the GPU(s) 615 to generate a rendering of the game session. For example, the input data may be representative of a movement of a character of the user in a game, firing a weapon, reloading, passing a ball, turning a vehicle, etc. The rendering component 612 may render the game session (e.g., representative of the result of the input data) and the render capture component 614 may capture the rendering of the game session as display data (e.g., as image data capturing the rendered frame of the game session). The rendering of the game session may include ray or path-traced lighting and/or shadow effects, computed using one or more parallel processing units—such as GPUs, which may further employ the use of one or more dedicated hardware accelerators or processing cores to perform ray or path-tracing techniques—of the server(s) 603. The encoder 616 may then encode the display data to generate encoded display data and the encoded display data may be transmitted to the client device 604 over the network(s) 606 via the communication interface 618. The client device 604 may receive the encoded display data via the communication interface 621 and the decoder 622 may decode the encoded display data to generate the display data. The client device 604 may then display the display data via the display 624.

It is noted that the techniques described herein may be embodied in executable instructions stored in a computer readable medium for use by or in connection with a processor-based instruction execution machine, system, apparatus, or device. It will be appreciated by those skilled in the art that, for some embodiments, various types of computer-readable media can be included for storing data. As used herein, a "computer-readable medium" includes one or more of any suitable media for storing the executable instructions of a computer program such that the instruction execution machine, system, apparatus, or device may read (or fetch) the instructions from the computer-readable medium and execute the instructions for carrying out the described embodiments. Suitable storage formats include one or more of an electronic, magnetic, optical, and electromagnetic format. A non-exhaustive list of conventional exemplary computer-readable medium includes: a portable computer diskette; a random-access memory (RAM); a read-only memory (ROM); an erasable programmable read only memory (EPROM); a flash memory device; and optical storage devices, including a portable compact disc (CD), a portable digital video disc (DVD), and the like.

It should be understood that the arrangement of components illustrated in the attached Figures are for illustrative purposes and that other arrangements are possible. For example, one or more of the elements described herein may be realized, in whole or in part, as an electronic hardware component. Other elements may be implemented in software, hardware, or a combination of software and hardware.

Moreover, some or all of these other elements may be combined, some may be omitted altogether, and additional components may be added while still achieving the functionality described herein. Thus, the subject matter described herein may be embodied in many different variations, and all such variations are contemplated to be within the scope of the claims.

To facilitate an understanding of the subject matter described herein, many aspects are described in terms of sequences of actions. It will be recognized by those skilled in the art that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar references in the context of describing the subject matter (particularly in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. Furthermore, the foregoing description is for the purpose of illustration only, and not for the purpose of limitation, as the scope of protection sought is defined by the claims as set forth hereinafter together with any equivalents thereof. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

What is claimed is:

1. A computer-implemented method, comprising:
   receiving denoised data generated by a neural network model;
   applying a function to the denoised data to compute degraded data, wherein the function is a data corruption process;
   receiving noisy input data;
   computing a result based on differences between the noisy input data and the degraded data after applying a pseudoinverse transformation of the function to each of the noisy input data and the degraded data; and
   combining the result and the denoised data to produce reconstructed data with a reduced number of artifacts compared with the noisy input data.

2. The computer-implemented method of claim 1, wherein the artifacts in the noisy input data result from applying the function to input data.

3. The computer-implemented method of claim 1, wherein the function is JPEG encoding and the pseudoinverse transformation of the function is JPEG decoding.

4. The computer-implemented method of claim 1, wherein the function is resolution reduction and the pseudoinverse transformation of the function is super resolution.

5. The computer-implemented method of claim 1, wherein the function is masking and the pseudoinverse transformation of the function is inpainting.

6. The computer-implemented method of claim 1, wherein the neural network model is pre-trained as a problem-agnostic denoising neural network model.

7. The computer-implemented method of claim 1, wherein the noisy input data is acquired from a sensor.

8. The computer-implemented method of claim 7, wherein the sensor captures an image.

9. The computer-implemented method of claim 1, wherein the neural network model processes Gaussian noise to generate the denoised data.

10. The computer-implemented method of claim 1, wherein the neural network model processes previous reconstructed data that approximates the noisy input data.

11. The computer-implemented method of claim 1, wherein the result comprises a vector-Jacobian product.

12. The computer-implemented method of claim 1, wherein computing the result comprises scaling a vector of the differences by a partial derivative of the denoised data with respect to previous reconstructed data with fewer artifacts compared with the noisy input data.

13. The computer-implemented method of claim 1, wherein combining the result and the denoised data comprises accumulating the denoised data and the result.

14. The computer-implemented method of claim 1, wherein the function is non-differentiable.

15. The computer-implemented method of claim 1, wherein at least one of the steps of applying, computing, and combining is performed on a server or in a data center to generate the reconstructed data, and the reconstructed data is streamed to a user device.

16. The computer-implemented method of claim 1, wherein at least one of the steps of applying, computing, and combining is performed within a cloud computing environment.

17. The computer-implemented method of claim 1, wherein at least one of the steps of applying, computing, and combining is performed for training, testing, or certifying a neural network employed in a machine, robot, or autonomous vehicle.

18. The computer-implemented method of claim 1, wherein at least one of the steps of applying, computing, and combining is performed on a virtual machine comprising a portion of a graphics processing unit.

19. A system, comprising:
   a processor that is connected to the memory, wherein the processor is configured to reconstruct data by:
   receiving denoised data generated by a neural network model;
   applying a function to the denoised data to compute degraded data, wherein the function is a data corruption process;
   receiving noisy input data;
   computing a result based on differences between the noisy input data and the degraded data after applying a pseudoinverse transformation of the function to each of the noisy input data and the degraded data; and
   combining the result and the denoised data to produce reconstructed data with a reduced number of artifacts compared with the noisy input data.

20. The system of claim 19, wherein the artifacts in the noisy input data result from applying the function to input data.

21. A non-transitory computer-readable media storing computer instructions for data reconstruction that, when executed by one or more processors, cause the one or more processors to perform the steps of:
   receiving denoised data generated by a neural network model;
   applying a function to the denoised data to compute degraded data, wherein the function is a data corruption process;
   receiving noisy input data;
   computing a result based on differences between the noisy input data and the degraded data after applying a pseudoinverse transformation of the function to each of the noisy input data and the degraded data; and
   combining the result and the denoised data to produce reconstructed data with a reduced number of artifacts compared with the noisy input data.

22. The non-transitory computer-readable media of claim 21, wherein computing the result comprises scaling a vector of the differences by a partial derivative of the denoised data with respect to previous reconstructed data with fewer artifacts compared with the noisy input data.

* * * * *